United States Patent
VanderKwaak

(10) Patent No.: US 10,320,617 B2
(45) Date of Patent: Jun. 11, 2019

(54) REPRESENTATION OF SERVERS IN A DISTRIBUTED NETWORK INFORMATION MANAGEMENT SYSTEM FOR EFFICIENT AGGREGATION OF INFORMATION

(71) Applicant: Illumio, Inc., Sunnyvale, CA (US)

(72) Inventor: Joel E. VanderKwaak, Mountain View, CA (US)

(73) Assignee: Illumio, Inc., Sunnyvale, CA (US)

( * ) Notice: Subject to any disclaimer, the term of this patent is extended or adjusted under 35 U.S.C. 154(b) by 168 days.

(21) Appl. No.: 15/263,193

(22) Filed: Sep. 12, 2016

(65) Prior Publication Data

US 2018/0077027 A1    Mar. 15, 2018

(51) Int. Cl.
*H04L 12/24*    (2006.01)

(52) U.S. Cl.
CPC .......... *H04L 41/12* (2013.01); *H04L 41/0893* (2013.01); *H04L 41/22* (2013.01)

(58) Field of Classification Search
CPC ...... H04L 41/12; H04L 41/0893; H04L 41/22
See application file for complete search history.

(56) References Cited

U.S. PATENT DOCUMENTS

| | | | |
|---|---|---|---|
| 2004/0039798 A1* | 2/2004 | Hotz | H04L 29/12066 709/219 |
| 2012/0144066 A1 | 6/2012 | Medved et al. | |
| 2014/0310415 A1* | 10/2014 | Kirner | H04L 41/082 709/225 |
| 2016/0080211 A1 | 3/2016 | Anand et al. | |

OTHER PUBLICATIONS

Invitation to Pay Additional Fees and, Where Applicable, Protest Fee for PCT Application No. PCT/US17/47036, Oct. 27, 2017, 2 Pages.
PCT International Search Report and Written Opinion for PCT/US17/47036, dated Dec. 28, 2017, 18 Pages.

* cited by examiner

*Primary Examiner* — Brian J. Gillis
*Assistant Examiner* — Chhian (Amy) Ling
(74) *Attorney, Agent, or Firm* — Fenwick & West LLP

(57) ABSTRACT

Communications between servers of a network are received and processed to generate network subgraphs. The network subgraph may be used for implementing administrative domain wide policies, for presenting information on a user interface, or for other purposes. A unit network subgraph is generated for each server. The unit network subgraph represents communications of the server with other servers. A network subgraph is generated by aggregating information of unit network subgraphs servers included in the network subgraph. The network subgraph may be used to evaluate an expression specified by an administrative domain wide policy. The result of evaluation of the expression may be used to determine whether actions specified by the policy are executed. The network subgraph may be used for processing network flow queries, for example, for displaying network information on a user interface.

16 Claims, 13 Drawing Sheets

REPRESENTATION OF SERVERS IN A DISTRIBUTED NETWORK INFORMATION MANAGEMENT SYSTEM FOR EFFICIENT AGGREGATION OF INFORMATION

BACKGROUND

1. Technical Field

The subject matter described herein generally relates to the field of managing servers (physical or virtual) of an administrative domain and, in particular, to representation of servers in a distributed network information management system for efficiently aggregating server information.

2. Background Information

Servers (physical or virtual) of an administrative domain are managed according to a policy. For example, a security policy might specify access control and/or secure connectivity, while a resource-usage policy might specify usage of the administrative domain's computing resources (e.g., disks and/or peripherals). Implementing a policy may require monitoring communications between various servers. There may be thousands of communications associated with each server over a given time period. Furthermore, there may be thousands of servers in an enterprise that are communicating with each other. Conventional techniques are unable to receive and process this information efficiently. Any delay in processing the communication information causes subsequent delay in the processing of any policy based on the information.

SUMMARY

The above and other issues are addressed by a method, non-transitory computer-readable storage medium, and system for implementing administrative domain wide policies based on network subgraphs.

An embodiment of the method implements administrative domain wide policies based on network subgraphs. The method comprises, receiving information describing communications between servers interacting via a network. Each communication is associated with an identifier of a source server, an identifier of a destination server, and attributes describing the communication. A unit network subgraph is generated for each server. The unit network subgraph comprises a node representing the server and edges describing communications of the server with other servers. A description of an administrative domain wide policy is received. The administrative domain wide policy specifies an expression representing a network subgraph. The network subgraph is generated as follows. A set of servers is identified based on the expression specified by the administrative domain wide policy. For each server from the set, a unit network subgraph describing the server is accessed. The edges of the network subgraph are updated based on edges of the unit network subgraph. The expression specified by the administrative domain wide policy is evaluated based on the network subgraph and one or more actions specified by the administrative domain wide policy are performed based on the result of evaluation of the expression.

An embodiment of a computer readable non-transitory storage medium stores instructions for performing the following steps. The steps comprise receiving information describing communications between servers interacting via a network. The steps further comprise generating unit network subgraph for each server. The steps further comprise receiving a description of an administrative domain wide policy. The administrative domain wide policy specifies an expression representing a network subgraph. The steps further comprise generating a network subgraph as follows. A set of servers is identified based on the expression specified by the administrative domain wide policy. For each server from the set, a unit network subgraph describing the server is accessed. The edges of the network subgraph are updated based on edges of the unit network subgraph. The steps further comprise evaluating the expression specified by the administrative domain wide policy based on the network subgraph and performing actions specified by the administrative domain wide policy based on the result of evaluation of the expression.

An embodiment of a computer system comprises one or more processors and a computer readable non-transitory storage medium storing instructions for execution by the one or more processors. The computer readable non-transitory storage medium stores instructions for performing the following steps. The steps comprise receiving information describing communications between servers interacting via a network. The steps further comprise generating unit network subgraph for each server. The steps further comprise receiving a description of an administrative domain wide policy. The administrative domain wide policy specifies an expression representing a network subgraph. The steps further comprise generating a network subgraph as follows. A set of servers is identified based on the expression specified by the administrative domain wide policy. For each server from the set, a unit network subgraph describing the server is accessed. The edges of the network subgraph are updated based on edges of the unit network subgraph. The steps further comprise evaluating the expression specified by the administrative domain wide policy based on the network subgraph and performing actions specified by the administrative domain wide policy based on the result of evaluation of the expression.

Another embodiment of the method processes network flow queries. The method comprises receiving information describing communications between servers interacting via a network. A unit network subgraph is generated for each server. A description of an administrative domain wide policy is received. A query representing a network subgraph is received. The network subgraph is generated as follows. A set of servers is identified based on the expression specified by the administrative domain wide policy. For each server from the set, a unit network subgraph describing the server is accessed. The edges of the network subgraph are updated based on edges of the unit network subgraph. Information describing the network subgraph is sent for presentation via a client device.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
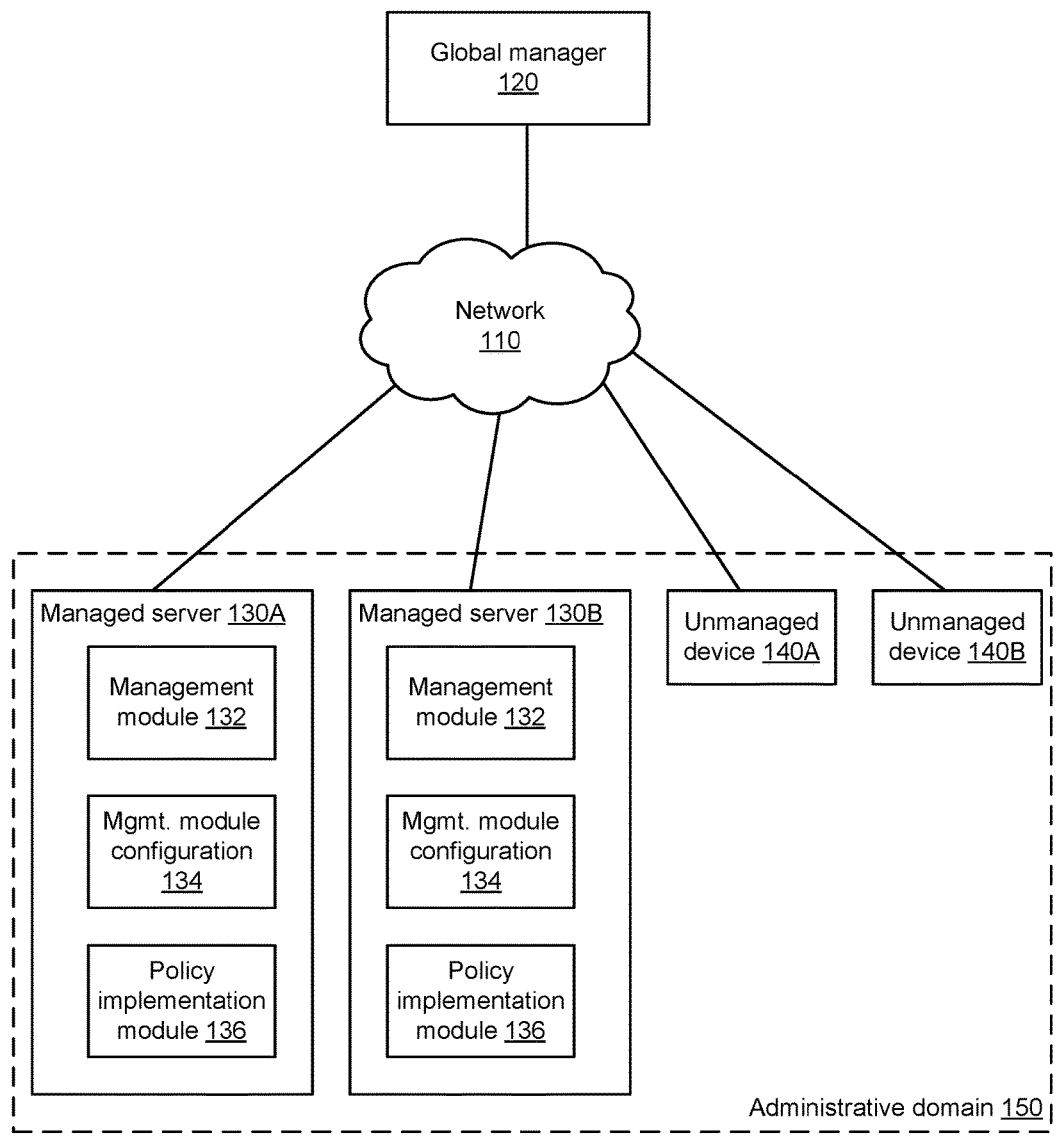
FIG. 1 is a high-level block diagram illustrating an environment for managing servers (physical or virtual) of an administrative domain, according to one embodiment.

FIG. 1 is a high-level block diagram illustrating an environment 100 for managing servers (physical or virtual) 130 of an administrative domain 150, according to one embodiment. The administrative domain 150 can correspond to an enterprise such as, for example, a service provider, a corporation, a university, or a government agency. The environment 100 may be maintained by the enterprise itself or by a third party (e.g., a second enterprise) that helps the enterprise manage its servers 130. As shown, the environment 100 includes a network 110, a global manager 120, multiple managed servers 130, and multiple unmanaged devices 140. An unmanaged device is also referred to as an unmanaged server. The multiple managed servers 130 and the multiple unmanaged devices 140 are associated with the administrative domain 150. For example, they are operated by the enterprise or by a third party (e.g., a public cloud service provider) on behalf of the enterprise. While one global manager 120, two managed servers 130, and two unmanaged devices 140 are shown in the embodiment depicted in FIG. 1 for clarity, other embodiments can have different numbers of global managers 120, managed servers 130, and/or unmanaged devices 140.

The network 110 represents the communication pathway between the global manager 120, the managed servers 130, and the unmanaged devices 140. In one embodiment, the network 110 uses standard communications technologies and/or protocols and can include the Internet. In another embodiment, the entities on the network 110 can use custom and/or dedicated data communications technologies.

A managed server 130 is a machine (physical or virtual) that implements an administrative domain-wide management policy 330 (shown in FIG. 3). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy 330 specifies whether and/or how entities associated with the administrative domain 150 are allowed to access (or be accessed by) other entities or otherwise consume (or provide) services. For example, the administrative domain-wide management policy 330 specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136. The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy 330. The management module configuration 134 generated by the policy implementation module 136 implements that administrative domain-wide management policy 330 (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

In one embodiment, the policy implementation module 136 is part of a larger proprietary module (not shown). The proprietary module is loaded onto a device (or virtual device) that already has a management module 132 and a management module configuration 134, thereby transforming the device (or virtual device) from an unmanaged device 140 to a managed server 130. The policy implementation module 136 is further described below with reference to FIGS. 4, 6, and 7.

An unmanaged device 140 is a computer (or set of computers) that does not include a policy implementation module 136. An unmanaged device 140 does not implement the administrative domain-wide management policy 330. However, interaction between a managed server 130 and an unmanaged device 140 can be subject to the administrative domain-wide management policy 330 (as implemented by the managed server 130). One example of an unmanaged device 140 is a network circuit that is used by an administrative domain 150. Another example of an unmanaged device 140 is a device used by a person to authenticate himself to the administrative domain 150 (e.g., a notebook or desktop computer, a tablet computer, or a mobile phone).

The global manager 120 is a computer (or set of computers) that generates management instructions for managed servers 130 and sends the generated management instructions to the servers. The management instructions are generated based on a) the state of the administrative domain's computer network infrastructure 320 and b) an administrative domain-wide management policy 330. The state of the administrative domain's computer network infrastructure 320 includes descriptions of managed servers 130 and (optionally) descriptions of unmanaged devices 140. The global manager 120 also processes local state information received from managed servers 130.

The administrative domain-wide management policy 330 is based on a logical management model that can reference managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
| --- | --- |
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy 330 (to the extent that the policy concerns the managed server 130). As a result, the administrative domain-wide management policy 330 is applied in a distributed fashion throughout the administrative domain 150, and there are no choke points. Also, the administrative domain-wide management policy 330 is applied at the logical level independent of the administrative domain's physical network topology and network addressing schemes.

The global manager 120, the state of the administrative domain's computer network infrastructure 320, and the administrative domain-wide management policy 330 are further described below with reference to FIG. 3.

Computer

Figure 2:
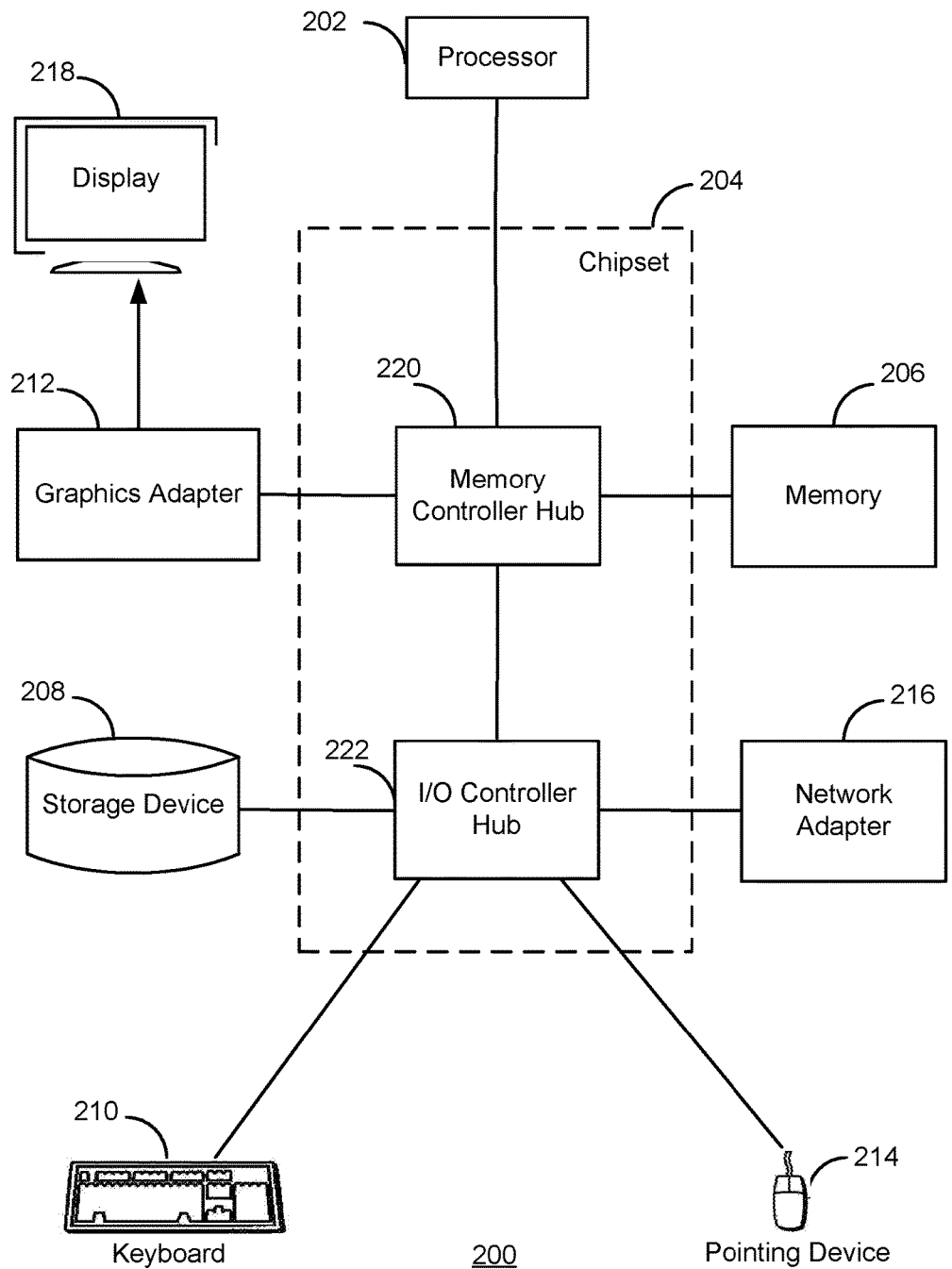
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while the unmanaged device 140 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Global Manager

Figure 3A:
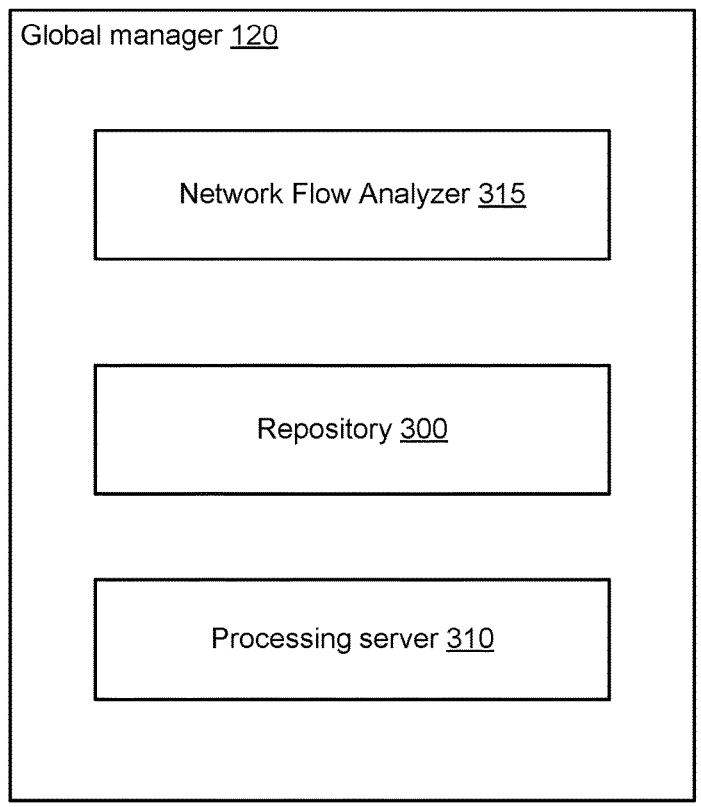
FIGS. 3A, 3B, and 3C show a high-level block diagram illustrating a detailed view of a global manager, according to one embodiment.
Figure 3B:
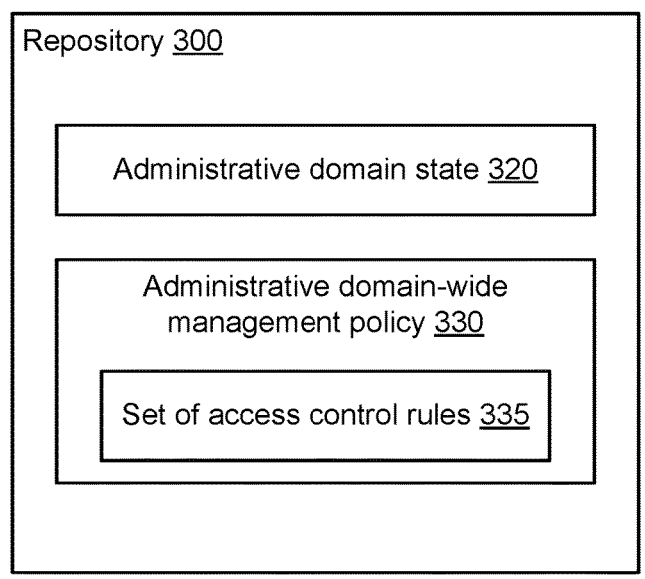
Figure 3C:
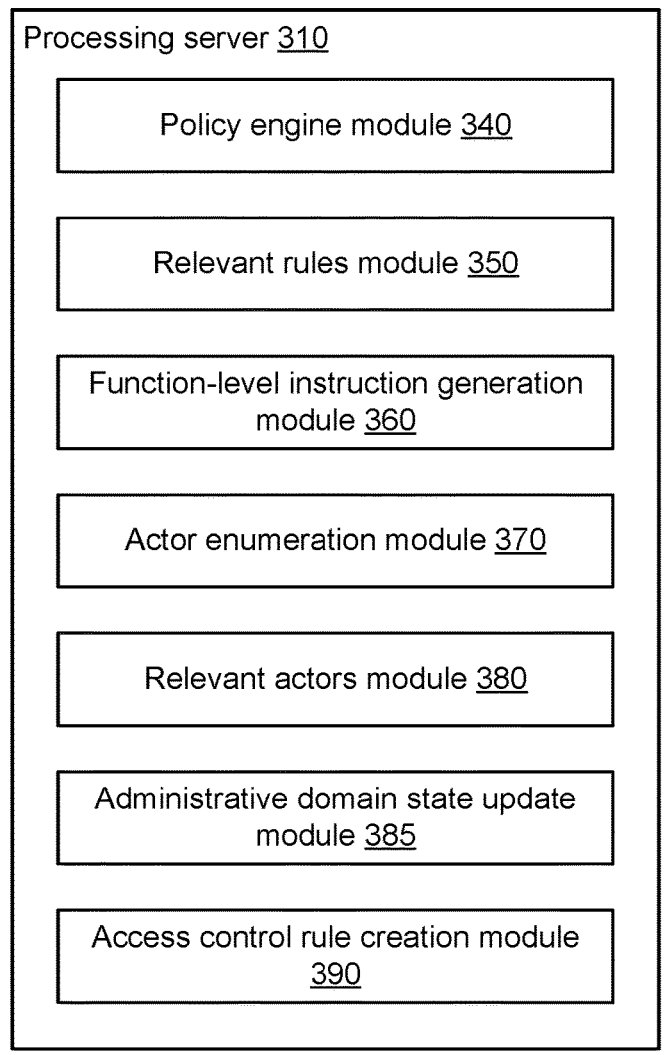

FIGS. 3A, 3B, and 3C show a high-level block diagram illustrating a detailed view of a global manager, according to one embodiment. As illustrated in FIG. 3A, the global manager 120 includes a network flow analyzer 315, a repository 300 and a processing server 310. The details of the network flow analyzer 315 are further provided in FIG. 5. As illustrated in FIG. 3B, the repository 300 is a computer (or set of computers) that stores the state of the administrative domain's computer network infrastructure 320 and the administrative domain-wide management policy 330. In one embodiment, the repository 300 includes a server that provides the processing server 310 access to the administrative domain state 320 and the management policy 330 in response to requests.

Administrative Domain State

The state of the administrative domain's computer network infrastructure 320 includes descriptions of managed servers 130 and (optionally) descriptions of unmanaged devices 140. A description of a managed server 130 includes, for example, a unique identifier (UID), an online/offline indicator, one or more configured characteristics (optional), network exposure information, service information, and one or more labels that describe the managed server 130 (a label set).

The UID uniquely identifies the managed server 130. The online/offline indicator indicates whether the managed server 130 is online or offline. A "configured characteristic" stores a value associated with the managed server 130 and can be any type of information (e.g., an indication of which operating system is running on the managed server). A configured characteristic is used in conjunction with a rule's condition portion (described below).

The network exposure information concerns the managed server's network interfaces. In one embodiment, the network exposure information includes, for each of the managed server's network interfaces, an identifier of a "bidirectionally-reachable network" (BRN) to which the network interface is attached and zero or more IP addresses (and their subnets) that are used for operating within the BRN. A BRN is a set of subnets, within an organization or across organizations, where any node within the BRN can establish communication with any other node in the BRN. For example, all of the nodes in a BRN have unique IP addresses. In other words, a BRN does not contain any NATs. Network exposure information (e.g., a network interface's BRN identifier) can be used in conjunction with a rule's condition portion.

In another embodiment, the network exposure information includes routing information and/or whether the managed server is behind a network address translator (NAT) (and, if it is behind a NAT, what type of NAT—1:1 or 1:N). The global manager 120 can determine whether a managed server 130 is behind a network address translator (NAT) (and, if it is behind a NAT, what type of NAT—1:1 or 1:N). For example, the global manager 120 determines whether a NAT exists between the global manager 120 and the managed server 130 by comparing (a) the server's IP address according to the TCP connection between the global manager and the server and (b) the server's IP address according to the local state information received from the server. If (a) and (b) differ, then a NAT exists between the global manager 120 and the managed server 130. If a NAT does exist, then the global manager 120 determines the type of NAT (1:1 or 1:N) by performing data center detection. For example, the global manager 120 identifies the server's data center by the data center's public IP address. (Alternatively, the managed server performs data center detection by querying information that is external to the server but inside the data center. The server then sends that information to the global manager as part of the local status.) Configuration information indicates which types of NATs are used by which data centers. If no NAT information is associated with a particular data center, then the global manager 120 assumes that the NAT type is 1:N.

The service information includes, for example, process information and/or package information. Process information includes, for example, names of processes that the managed server 130 is running, which network ports and network interfaces those processes are listening on, which users initiated those processes, configurations of those processes, command-line launch arguments of those processes, and dependencies of those processes (e.g., shared objects to which those processes link). (Those processes correspond to the managed server 130 providing a service or using a service.) Package information includes, for example, which packages (executables, libraries, or other components) are installed on the managed server 130, the versions of those packages, the configurations of those packages, and the hash values of those packages.

A description of an unmanaged device 140 includes, for example, network exposure information (e.g., the IP address of the unmanaged device 140 and an identifier of the BRN to which the unmanaged device 140 is connected). An unmanaged device 140 is part of an "unmanaged device group" (UDG). An UDG includes one or more unmanaged devices 140. For example, the "Headquarters UDG" could include the primary circuit and the backup circuit that are used by an administrative domain's headquarters, where each circuit is associated with an IP address. An UDG is associated with a unique identifier (UID). Information stored in the administrative domain state 320 regarding an UDG includes the UID of the UDG and information regarding the unmanaged devices 140 in the UDG (e.g., their network exposure information).

Descriptions of managed servers 130 and unmanaged devices 140 can be loaded into the administrative domain state 320 in various ways, such as by interacting with the global manager 120 via a graphical user interface (GUI) or an application programming interface (API). Descriptions of managed servers 130 can also be loaded into the administrative domain state 320 based on local status information received from managed servers (described below).

Regarding managed servers' labels specifically (and configured characteristics, if any), the assignment (or reassignment) of a value for a dimension (or the setting of a configured characteristic's value) can be performed in even more ways. For example, the assignment/setting can be performed using a deployment and configuration tool as part of provisioning a managed server 130. Any such tool can be used, including off-the-shelf third-party tools (e.g., Puppet Labs' Puppet software, Opscode's Chef software, or CFEngine AS' CFEngine software) and custom tools that an administrative domain 150 might have.

As another example, the assignment/setting can be performed by a "label/configured characteristic engine" (not shown) that calculates labels and/or configured characteristic ("CC") values. In one embodiment, the label/CC engine calculates labels/CC values based on label/CC assignment rules. A label/CC assignment rule is a function that accesses data from the administrative domain state 320 and assigns (or suggests assignment of) a label or a CC value. A label/CC assignment rule can be preset or user-configurable. For example, the global manager 120 includes a set of pre-defined rules, but the end-user can modify and/or delete those rules and add new rules based on the user's own custom requirements. Label/CC assignment rules can be evaluated for a managed server 130 during the initialization process. Label/CC value suggestions can then be made for any dimension/CC, and the end-user can accept or reject those suggestions. For example, if a managed server 130 is executing the Postgres database or the MySQL database, then the suggested label could be <Role, Database>. If a managed server is executing the Linux operating system, then the suggested value for the operating system CC could be "Linux."

In another embodiment, the label/CC engine calculates labels/CC values based on cluster analysis. For example, the label/CC engine uses a combination of min-cut and K-means algorithms, with additional heuristics, of connected graphs to automatically identify a cluster of highly-connected managed servers 130. The cluster of managed servers 130 might correspond to an "application" (see Table 1) in the administrative domain 150. The end-user can choose to apply a value for the Application dimension (or any other dimension) to those managed servers 130 en masse.

Administrative Domain-Wide Management Policy

The administrative domain-wide management policy 330 includes one or more rules. Broadly speaking, a "rule" specifies a relationship between one or more providers of a service and one or more consumers of that service.

Rule Function—The relationship is subjected to a "rule function", which is the practical effect of the rule. For example, in the case of security, the rule function could be access control, secure connectivity, disk encryption, or control of executable processes. A rule with an access control function specifies whether a consumer may use a provider's service. In one embodiment, the access control function uses a pure "whitelist" model, which means that only the allowable relationships are expressed, and all other relationships are blocked by default. A rule with a secure connectivity function specifies over what secure channels (e.g., encrypted network sessions using point-to-point data encryption) a consumer may use a provider's service. For example, a rule with a secure connectivity function could specify that usage of a provider's services must be encrypted when the provider is located in the US and the consumer is located in the EU. A rule with a disk encryption function specifies whether a provider must store its data on an encrypted file system. A rule with an executable process-control function specifies whether a process is allowed to execute.

In the case of resource usage, the rule function could be disk-usage or peripheral-usage. A rule with a disk-usage function specifies an amount of data that a consumer can store on a provider. Note that a rule can specify other rule functions as well beyond just access control, secure connectivity, disk encryption, control of executable processes, disk usage, and peripheral usage. For example, a rule function could specify which Open Systems Interconnection (OSI) model Layer-7 services to apply to network traffic, the amount of metadata to collect for security analytics, or the triggers for capturing a complete network packet. The management policy model supports any number of rule functions that can be applied.

A rule function can be associated with one or more settings (referred to herein as a "function profile") that specify details regarding the practical effect of the rule. For example, settings associated with a secure connectivity rule function can be a list of cryptographic algorithms used to encrypt network traffic. In one embodiment, a rule function is associated with multiple function profiles, and a function profile includes a priority. This priority is used by the function-level instruction generation module 360, as described below.

Service—In general, a "service" is an arbitrary process executing on a specific network port using a specific network protocol. A service of a rule within the management policy 330 is specified by a port/protocol pair and (optionally) additional qualifications, such as process information and/or package information (described above with respect to a description of a managed server 130 within the administrative domain state 320). If a managed server 130 has multiple network interfaces, then a service can be exposed on all networks or on only a subset of those networks. The end-user specifies on which networks the service is exposed. Note that, depending on the rule function, a service might not use any network resources. For example, a service for an executable process-control rule function does not execute on a network port using a network protocol.

Providers/Consumers—The one or more providers of the service and the one or more consumers (i.e., users) of the service are managed servers 130 and/or unmanaged devices 140.

In one embodiment, a rule is represented within the administrative domain-wide management policy 330 using a set of information that includes a rule function portion, a service portion, a provided-by portion, a used-by portion, and an optional rule condition portion. The rule function portion describes the practical effect of the rule and can be associated with one or more settings (function profiles). The service portion describes the service to which the rule applies. If the service portion indicates "All", then the rule applies to all services.

The provided-by (PB) portion describes which managed servers 130 and/or unmanaged devices 140 can provide the service (i.e., who the "providers" are). If the PB portion indicates "Anybody", then anybody (e.g., any managed server 130 or unmanaged device 140) can provide the service. If the PB portion indicates "Any managed server", then any managed server 130 can provide the service. ("Any managed server" is equivalent to specifying a label set that contains a wildcard, thereby matching all managed servers 130.) The used-by (UB) portion describes which managed servers 130 and/or unmanaged devices 140 can use the service (i.e., who the "consumers" are). Similar to the PB portion, the UB portion can also indicate "Anybody" or "Any managed server."

Within the PB portion and the UB portion, a managed server 130 is specified by using a label set (i.e., one or more labels that describe the managed server) or a UID. The ability to specify managed servers 130 using label sets stems from the logical management model, which references managed servers based on their dimensions and values (labels). An unmanaged device 140 is specified by using a UID of an unmanaged device group (UDG). If a rule specifies an UDG, then the rule includes additional information regarding the unmanaged devices 140 in that group (e.g., the devices' network exposure information). The PB portion of a rule and/or the UB portion of a rule can include multiple items, including label sets (to specify managed servers 130), managed server UIDs, and/or UDG UIDs.

The rule condition portion, which is optional, specifies whether the rule applies to a particular managed server 130 and/or a particular network interface of that managed server. The rule condition portion is a Boolean expression that includes one or more configured characteristics ("CCs"; part of a managed server's description in the administrative domain state 320) and/or network exposure information (e.g., a network interface's BRN identifier; also part of a managed server's description in the administrative domain state 320). A CC portion of the expression specifies whether the rule applies to the particular managed server, while a network exposure information portion of the expression specifies whether the rule applies to a particular network interface of that managed server. If the expression evaluates to "true" for a particular managed server's configured characteristics (specifically, for the values of that managed server's configured characteristics) and a particular network interface's information, then the rule applies to that managed server and that managed server's relevant network interface. If the expression evaluates to "false", then the rule does not apply to that managed server and that managed server's relevant network interface. For example, if a configured characteristic stores an indication of which operating system is running on the managed server, then a rule condition portion that includes that configured characteristic can control whether the rule applies to a particular managed server based on that server's operating system.

Rules within the administrative domain-wide management policy 330 are organized into rule lists. Specifically, the management policy 330 includes one or more rule lists, and a rule list includes one or more rules and (optionally) one or more scopes. A "scope" constrains where (i.e., to which managed servers 130) a rule is applied. A scope includes a provided-by (PB) portion and a used-by (UB) portion that limit the application of the rules in the rule list. The PB portion of the scope limits the PB portion of the rules, and the UB portion of the scope limits the UB portion of the rules. The PB and UB portions of a scope can specify a group of managed servers 130 by using a label set. If the label set does not contain a label for a specific dimension, then there is no scoping of that dimension for the resulting group of managed servers 130. If a rule list does not include any scopes, then its rules are applied globally.

Different scopes can be applied to a single rule list. For example, an end-user can build a set of rules that express how the web service tier (managed servers 130 with a <Role, Web> label) consumes services from the database tier (managed servers with a <Role, Database> label), how the load-balancing tier consumes services from the web service tier, and so on. Then, if the end-user wants to apply this rule list to his production environment (managed servers 130 with an <Environment, Production> label) and to his staging environment (managed servers with an <Environment, Staging> label), he does not need to copy or duplicate the rule list. Instead, he applies multiple scopes to a single rule list (a first scope where the PB portion and the UB portion include the <Environment, Production> label and a second scope where the PB portion and the UB portion include the <Environment, Staging> label). The scope abstraction makes the rule list scale from both a usability perspective and a computational perspective.

Now that the administrative domain-wide management policy 330 has been described, it is helpful to work through some examples. Consider an administrative domain 150 with a two-tier application where a user device accesses a web server (the first tier), and the web server accesses a database server (the second tier). In the first tier, the user device is the consumer, and the web server is the provider. In the second tier, the web server is the consumer, and the database server is the provider. The administrative domain 150 includes two instances of this application: one in a production environment and one in a staging environment.

The web servers and the database servers are managed servers 130, and their descriptions (e.g., label sets) are present in the administrative domain state 320. For example, their label sets are:
web server in production: <Role, Web> and <Environment, Production>
database server in production: <Role, Database> and <Environment, Production>
web server in staging: <Role, Web> and <Environment, Staging>
database server in staging: <Role, Database> and <Environment, Staging>
(The Application dimension, the Line of Business dimension, and the Location dimension are not relevant to this example, so their labels are omitted.)

Now consider the following administrative domain-wide management policy 330, which is a security policy that specifies access control and secure connectivity:
Rule List #1
  Scopes
    <Environment, Production>
    <Environment, Staging>
    Rules
    #1
      Function: Access Control
      Service: Apache
      PB: <Role, Web>
      UB: Anybody
    #2
      Function: Access Control
      Service: PostgreSQL
      PB: <Role, Database>
      UB: <Role, Web>
Rule List #2
  Scopes: None
  Rules
  #1
    Function: Secure Connectivity
    Service: All
    PB: <Role, Database>
    UB: Any managed server
  Note that the rules above refer to services simply as "Apache" and "PostgreSQL" for clarity. Remember that a service is a process and is specified by a port/protocol pair and (optionally) additional qualifications, such as process information and/or package information (described above with respect to a description of a managed server 130 within the administrative domain state 320).

Rule List #1/Rule #1 allows any device (e.g., a user device) to connect to a web server and use the Apache service. Specifically, the allowance of a connection is specified by "Access Control" in the Function portion. The "any device" is specified by "Anybody" in the UB portion. The "web server" is specified by "<Role, Web>" (a label set that includes only one label) in the PB portion. The Apache service is specified by "Apache" in the Service portion.

Rule List #1/Rule #2 allows a web server to connect to PostgreSQL on a database server. Specifically, the allowance of a connection is specified by "Access Control" in the Function portion. The "web server" is specified by "<Role, Web>" in the UB portion. The "PostgreSQL" is specified by "PostgreSQL" in the Service portion. The "database server" is specified by "<Role, Database>" (a label set that includes only one label) in the PB portion.

Rule List #1 also prevents inter-environment connections. For example, a web server is allowed to connect to PostgreSQL on a database server if the web server and database server are both in the same environment (e.g., both in the production environment or both in the staging environment). Both servers in the production environment is specified by "<Environment, Production>" (a label set that includes only one label) in the Scope portion, while both servers in the staging environment is specified by "<Environment, Staging>" (a label set that includes only one label) in the Scope portion. (Since the scopes in this example do not distinguish between the PB portion and the UB portion, each scope's label set is applied to both the PB portion and the UB portion.) As a result, a web server is not allowed to connect to PostgreSQL on a database server if the servers are in different environments (e.g., if the web server is in the staging environment and the database server is in the production environment).

Rule List #2 states that whenever any managed server connects to a database server, that connection must be performed through an encrypted channel. Specifically, the "database server" is specified by "<Role, Database>" in the PB portion. The "encrypted channel" is specified by "Secure Connectivity" in the Function portion. The "any managed server" is specified by "Any managed server" in the UB portion. The "whenever" is specified by "All" in the Service portion.

Turning aside from the above example, consider the following two managed servers 130: Server 1 is a web server that is part of production, part of app1, and owned by engineering in California. It would be labeled as:

<Role, Web>
<Environment, Production>
<Application, app1>
<LB, Engineering>
<Location, US>

Server 2 is a database server that is part of production, also part of app1, and also owned by engineering but in Germany. It would be labeled as:

<Role, Database Server>
<Environment, Production>
<Application, app1>
<LB, Engineering>
<Location, EU>

Assume that an access control rule allows all access to all managed servers 130 that are part of app1. This rule would allow Server 1 and Server 2 to communicate with each other and would disallow a managed server 130 in Germany that is part of app2 from communicating with Server 1 or Server 2. Now assume that a secure connectivity rule specifies that all network traffic between EU and US must be encrypted. Rule functions are independently applied. In other words, the secure connectivity rule is a separate policy that is applied independent of the access control rule. As a result, the network traffic from Server 1 to Server 2 would be allowed (given the access control rule) and encrypted (given the secure connectivity rule).

Returning to FIG. 3, the administrative domain-wide management policy 330 includes a set of access control rules 335.

Processing Server

The processing server 310 generates management instructions for managed servers 130 and sends the generated management instructions to the servers. The processing server 310 also processes local state information received from managed servers 130. The processing server 310 includes various modules such as a policy engine module 340, a relevant rules module 350, a function-level instruction generation module 360, an actor enumeration module 370, a relevant actors module 380, an administrative domain state update module 385, and an access control rule creation module 390. In one embodiment, the processing server 310 includes a computer (or set of computers) that communicates with the repository 300 and processes data (e.g., by executing the policy engine module 340, the relevant rules module 350, the function-level instruction generation module 360, the actor enumeration module 370, the relevant actors module 380, the administrative domain state update module 385, and the access control rule creation module 390).

The relevant rules module 350 takes as input the administrative domain-wide management policy 330 and an indication of a particular managed server 130 (e.g., that server's UID), generates a set of rules that are relevant to that server, and outputs the set of rules. This is a filtering process by which the relevant rules module 350 examines the management policy 330 and extracts only the relevant rules for the given managed server 130. The relevant rules module 350 performs the filtering by iterating through all of the rule lists in the management policy 330, analyzing the scopes of each rule list to determine whether the scopes apply to this managed server 130 and (if the scopes do apply to this managed server 130) analyzing the rules of each rule list to determine whether those rules apply to this managed server 130. A rule applies to a managed server 130 if a) the PB portion of the rule and/or the UB portion of the rule specifies the managed server and b) the condition portion of the rule (if present) evaluates to "true" for that managed server (specifically, for the values of that managed server's configured characteristics and network exposure information). The end result (referred to herein as a "management policy perspective") is a collection of two sets of rules: rules where this managed server 130 provides a service and rules where this managed server 130 consumes a service.

The function-level instruction generation module 360 takes as input a set of rules (e.g., a management policy perspective generated by the relevant rules module 350), generates function-level instructions, and outputs the function-level instructions. The function-level instructions are later sent to a managed server 130 as part of the management instructions. A function-level instruction is similar to a rule in that each one includes a rule function portion, a service portion, a PB portion, and a UB portion. However, whereas a rule can include multiple items within its PB portion and/or UB portion (including label sets, managed server UIDs, and/or UDG UIDs), a function-level instruction includes only one item within its PB portion and only one item within its UB portion. Also, whereas a rule can specify a managed server (including its multiple network interfaces) within its PB portion and/or UB portion, a function-level instruction includes only one network interface within its PB portion and UB portion.

The function-level instruction generation module 360 analyzes a rule and generates one or more function-level instructions based on that rule. If the rule's PB portion includes multiple items, the rule's UB portion includes multiple items, or a managed server referenced by the rule (in the PB portion or UB portion) has multiple network interfaces, then the function-level instruction generation module 360 generates multiple function-level instructions (e.g., one function-level instruction for each possible combination of a PB item, a UB item, and a particular network interface).

Consider a rule that includes two items in its PB portion (A and B) and two items in its UB portion (C and D). The function-level instruction generation module 360 would generate four function-level instructions with the following PB and UB portions: 1) PB=A, UB=C; 2) PB=A, UB=D; 3) PB=B, UB=C; 4) PB=B, UB=D. Now consider a rule that covers a managed server in its PB portion or UB portion (e.g., by specifying a UID or a label set), and that managed server has multiple network interfaces. The function-level instruction generation module 360 would generate multiple function-level instructions (e.g., one function-level instruction for each network interface of the managed server).

The function-level instruction generation module 360 analyzes the rules, the functions within those rules, and the function profiles referenced by those rules. If a rule list includes multiple scopes, then the function-level instruction generation module 360 applies those scopes multiple times to the rule list iteratively (thereby generating a complete set of function-level instructions for each scope). Recall that a rule function can be associated with multiple function profiles, and a function profile can include a priority. The function-level instruction generation module 360 orders the rules based on the priorities of the various function profiles such that the function profile with the highest priority is used. The function-level instruction generation module 360 translates the ordered rules into function-level instructions for the managed server 130 to execute. Function-level instructions reference the appropriate managed servers 130 and/or unmanaged devices 140 (e.g., the managed servers 130 and/or unmanaged devices 140 that were referenced in the input rules), taking into account the network exposure details of the services associated with the rules.

Note that the function-level instruction generation module 360 can generate a function-level instruction for a particular managed server 130 that turns out to be irrelevant for that server. For example, that managed server is covered by the provided-by (PB) portion of a rule, so the function-level instruction generation module 360 generates a corresponding function-level instruction. However, the rule also includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The managed server checks its local state (e.g., whether it is providing that service) and processes the function-level instruction accordingly, as explained below with reference to the policy compilation module 410.

The actor enumeration module 370 takes as input a collection of descriptions of managed servers 130 and unmanaged device groups (UDGs) (e.g., the state of the administrative domain's computer network infrastructure 320), generates representations of those descriptions of servers and UDGs in an enumerated form (referred to as "actor-sets"), and outputs the actor-sets. For example, the actor enumeration module 370 enumerates the managed servers 130 and the UDGs within the administrative domain state 320 and the possible label sets and assigns each a unique identifier (UID). These actor-sets can then be used in conjunction with UB portions and PB portions of rules and scopes, which specify actors using managed server UIDs, UDG UIDs, and/or label sets.

Consider a logical management model that includes a set of N dimensions $D_i$ (i=1, . . . , N), and each dimension $D_i$ includes a set $S_i$ of possible values $V_j$ (j=1, . . . , $M_i$) (where the wildcard "*" is one of the possible values). In one embodiment, the actor enumeration module 370 enumerates all label sets that are possible based on the logical management model, which are equal to the Cartesian product given by $S_1 \times S_2 \times \ldots \times S_N$. The size of this set is $M_1 \times M_2 \times \ldots \times M_N$. The enumeration process collapses the multi-dimensional label space of the managed servers 130 into a simple enumerated form.

In another embodiment, the actor enumeration module 370 enumerates only those label sets that are possible based on the administrative domain state 320 (e.g., based on descriptions of managed servers within the administrative domain 150). For example, consider a logical management model that includes 2 dimensions (X and Y), and each dimension includes 3 possible values (A, B, and *). A managed server with the label set "<X=A>, <Y=B>" can be a member of 4 possible label sets: 1) "<X=A>, <Y=B>", 2) "<X=A>, <Y=*>", 3) "<X=*>, <Y=B>", and 4) "<X=*>, <Y=*>". Note that the managed server's label set exists in 2-dimensional space (X and Y), while possible label sets 2, 3, and 4 are projections of the managed server's label set into sub-dimensional spaces (label set 2 is 1-dimensional space (X), label set 3 is 1-dimensional space (Y), and label set 4 is 0-dimensional space). So, the actor enumeration module 370 enumerates those 4 possible label sets. The managed server with the label set "<X=A>, <Y=B>" cannot be a member of the label set "<X=A>, <Y=A>", so the actor enumeration module 370 does not enumerate that label set.

In yet another embodiment, the actor enumeration module 370 enumerates only those label sets that are used in the administrative domain-wide management policy 330 (e.g., in UB portions and PB portions of rules and scopes).

An actor-set includes a UID and zero or more actor-set records. An actor-set record includes a UID (either a managed server UID or an UDG UID), an identifier of the actor's operating system, and the IP address of the actor (managed server 130 or unmanaged device 140) given the specific BRN. For example, an actor-set might include actor-set records whose IP addresses correspond to all of the managed servers 130 covered by the label set of <Role, Database> and <Environment, Production>. As another example, an actor-set might include actor-set records whose IP addresses correspond to all of the unmanaged devices 140 in the Headquarters UDG. A single actor (e.g., managed server 130 or unmanaged device 140) can appear in multiple actor-sets.

Another factor in the actor-set calculation is actors with multiple network interfaces, plus the inclusion of network topology such as network address translation (NAT). So, there could be two actor-sets for the label set of <Role, Database> and <Environment, Production>: one actor-set with the internet-facing IP addresses of those managed servers 130 (i.e., associated with a first BRN), and a different actor-set for those same managed servers with the private network-facing IP addresses of those managed servers (i.e., associated with a second BRN).

In one embodiment, the actor enumeration module 370 can also update actor-sets based on changes to the administrative domain state 320. For example, the actor enumeration module 370 takes as input actor-sets (previously output by the actor enumeration module) and a change to a managed server's description (within the administrative domain state 320), generates updated actor-sets (which are consistent with the changed server description), and outputs the updated actor-sets. The actor enumeration module 370 generates the updated actor-sets in different ways depending on the type of change to the managed server's description.

Offline/online change—If the description change indicates that the server went from online to offline, then the actor enumeration module 370 generates the updated actor-sets by removing the server's actor-set record from all input actor-sets of which the server was a member. If the description change indicates that the server went from offline to online, then the actor enumeration module 370 generates the updated actor-sets by adding the server's actor-set record to any relevant input actor-sets. (If necessary, the actor enumeration module 370 creates a new actor-set and adds the server's actor-set record to that new actor-set.)

Label set change—If the description change indicates that the server's label set changed, then the actor enumeration module 370 treats this like a first server (with the old label set) going offline and a second server (with the new label set) coming online.

Network exposure information change—If the description change indicates that the server removed a network interface, then the actor enumeration module 370 generates the updated actor-sets by removing the server's actor-set record from all input actor-sets (associated with that network interface's BRN) of which the server was a member. If the description change indicates that the server added a network interface, then the actor enumeration module 370 generates the updated actor-sets by adding the server's actor-set record to any relevant input actor-sets (associated with that network interface's BRN). (If necessary, the actor enumeration module 370 creates a new actor-set (associated with that network interface's BRN) and adds the server's actor-set record to that new actor-set.) If the description change indicates that the server changed a network interface's BRN, then the actor enumeration module 370 treats this like a first network interface (with the old BRN) being removed and a second network interface (with the new BRN) being added. If the description change indicates that the server changed a network interface's IP address (but not the BRN), then the actor enumeration module 370 generates the updated actor-sets by modifying the server's actor-set record in all input actor-sets (associated with that network interface's BRN) of which the server was a member.

The relevant actors module 380 takes as input one or more actor-sets (e.g., the managed servers 130 and the UDGs within the administrative domain state 320 in enumerated form) and a set of rules (e.g., a management policy perspective), determines which actor-sets are relevant to those rules, and outputs only those actor-sets. This is a filtering process by which the relevant actors module 380 examines the actor-sets and extracts only the relevant actor-sets for the given set of rules. The relevant actors module 380 performs the filtering by iterating through all of the input actor-sets, analyzing the PB portions and UB portions of the input rules to determine whether a particular actor-set is referenced by any of the rules' PB portions or UB portions. The end result (referred to herein as an "actor perspective") is a collection of actor-sets. The actor perspective is later sent to a managed server 130 as part of the management instructions.

In one embodiment, the relevant actors module 380 uses the input set of rules to generate an "actor-set filter." The actor-set filter selects, from the input actor-sets, only the actor-sets that are relevant to the input rules. In other words, the relevant actors module 380 uses the actor-set filter to filter the input actor-sets into relevant actor-sets.

The policy engine module 340 generates management instructions for managed servers 130 and sends the generated management instructions to the servers. The policy engine module 340 generates the management instructions (using the relevant rules module 350, the function-level instruction generation module 360, the actor enumeration module 370, and the relevant actors module 380) based on a) the state of the administrative domain's computer network infrastructure 320 and b) the administrative domain-wide management policy 330.

For example, the policy engine module 340 executes the relevant rules module 350, providing as input the administrative domain-wide management policy 330 and the UID of a particular managed server 130. The relevant rules module 350 outputs a set of rules that are relevant to that server (a "management policy perspective"). The policy engine module 340 executes the actor enumeration module 370, providing as input the administrative domain state 320. The actor enumeration module 370 outputs a representation of the descriptions of the managed servers 130 and unmanaged device groups (UDGs) within the administrative domain state 320 in an enumerated form ("actor-sets"). The policy engine module 340 executes the function-level instruction generation module 360, providing as input the management policy perspective (output by the relevant rules module 350). The function-level instruction generation module 360 outputs function-level instructions. The policy engine module 340 executes the relevant actors module 380, providing as input the actor-sets (output by the enumeration module 370) and the management policy perspective (output by the relevant rules module 350). The relevant actors module 380 outputs only those actor-sets that are relevant to those rules ("relevant actor-sets"). The policy engine module 340 sends the function-level instructions (output by the function-level instruction generation module 360) and the relevant actor-sets (output by the relevant actors module 380) to the particular managed server 130.

In one embodiment, the policy engine module 340 caches information that was generated during the above process. For example, the policy engine module 340 caches, in association with the particular managed server 130, the management policy perspective, the function-level instructions, the actor-set filter, and/or the relevant actor-sets. As another example, the policy engine module 340 caches the administrative domain's actor-sets (which are not specific to a particular managed server 130).

Since an administrative domain's actor-sets are based on the administrative domain state 320, a change to the administrative domain state 320 can require a change to the administrative domain's actor-sets. Similarly, since a managed server's management instructions are based on the administrative domain state 320 and the administrative domain-wide management policy 330, a change to the administrative domain state 320 and/or a change to the administrative domain-wide management policy 330 can require a change to the managed server's management instructions. In one embodiment, the policy engine module 340 can update an administrative domain's actor-sets and/or update a managed server's management instructions and then distribute these changes (if necessary) to managed servers 130. The cached information mentioned above helps the policy engine module 340 more efficiently update the administrative domain's actor-sets and/or the managed server's management instructions and distribute the changes.

In one embodiment, the policy engine module 340 updates an administrative domain's actor-sets (based on a change to the administrative domain state 320) and distributes the changes to managed servers 130 as follows: The policy engine module 340 executes the actor enumeration module 370, providing as input the cached actor-sets (previously output by the actor enumeration module) and the changed portion of the administrative domain state 320 (e.g., a changed server description). The actor enumeration module 370 outputs the updated actor-sets. In one embodiment, the policy engine module 340 then sends all of the updated actor-sets to all of the managed servers 130 within the administrative domain 150. However, that embodiment is inefficient, since not all managed servers are affected by changes to all actor-sets.

In another embodiment, only selected actor-sets are sent to selected servers. For example, a particular managed server is sent only those actor-sets that a) were previously sent to that server and b) have changed. The cached relevant actor-sets indicate which actor-sets were previously sent to that server (see (a) above). The policy engine module 340 compares the cached actor-sets to the updated actor-sets to determine which actor-sets have changed (see (b) above). The policy engine module 340 then computes the intersection of (a) and (b). Actor-sets in that intersection are sent to the particular managed server. In one embodiment, for even greater efficiency, actor-sets are sent in "cliff" format, which describes differences between the cached actor-sets and the updated actor-sets. For example, the diff format specifies an actor-set identifier, an actor identifier (e.g., a managed server UID or an UDG UID), and an indication of whether that actor should be added to, removed from, or modified within the actor-set.

In yet another embodiment, two tables are maintained and used to improve efficiency. A first table associates a managed server 130 with actor-sets of which that managed server is a member. A second table associates a managed server 130 with actor-sets that are relevant to that managed server (e.g., as determined by the relevant actors module 380). In these tables, a managed server 130 is represented by, e.g., that managed server's UID, and an actor-set is represented by, e.g., that actor-set's UID. The policy engine module 340 uses the changed portion of the administrative domain state 320 (e.g., the changed server description) to determine which managed server's description changed. The policy engine module 340 uses the first table to determine which actor-sets that managed server was a member of. Those actor-sets might change as a result of the changed server description. So, the policy engine module 340 uses the second table to determine managed servers that are relevant to those actor-sets. The policy engine module 340 performs the intersection computation described above for only those managed servers.

In one embodiment, the policy engine module 340 updates a managed server's management instructions (based on a change to the administrative domain state 320) and sends the updated management instructions to the managed server as follows: The policy engine module 340 executes the relevant rules module 350, providing as input the administrative domain-wide management policy 330 and the UID of the managed server 130. The relevant rules module 350 outputs a set of rules that are relevant to that server (a "management policy perspective"). The policy engine module 340 compares the management policy perspective that was just output to the cached management policy perspective to determine whether they differ. If the just-output management policy perspective and the cached management policy perspective are identical, then the policy engine module 340 takes no further action. In this situation, the previously-generated managed server's management instructions (specifically, the function-level instructions and relevant actor-sets) are consistent with the change to the administrative domain state 320 and do not need to be re-generated and re-sent to the managed server.

If the just-output management policy perspective and the cached management policy perspective differ, then the policy engine module 340 determines which rules should be added to the cached perspective and which rules should be removed from the cached perspective. The policy engine module 340 executes the function-level instruction generation module 360, providing as input the rules to add and the rules to remove. The function-level instruction generation module 360 outputs function-level instructions to add and function-level instructions to remove (relative to the cached function-level instructions, which were previously sent to the managed server). The policy engine module 340 instructs the managed server to add or remove the various function-level instructions, as appropriate. In one embodiment, for greater efficiency, function-level instructions are sent in "diff" format, which describes differences between the cached function-level instructions and the updated function-level instructions. For example, the diff format specifies a function-level instruction identifier and an indication of whether that function-level instruction should be added to or removed from the previously-sent function-level instructions.

The policy engine module 340 also executes the actor enumeration module 370, providing as input the cached actor-sets and the changed portion of the administrative domain state 320 (e.g., the changed server description). The actor enumeration module 370 outputs the updated actor-sets. The policy engine module 340 executes the relevant actors module 380, providing as input the updated actor-sets and the just-output management policy perspective. The relevant actors module 380 outputs only those updated actor-sets that are relevant to those rules ("updated relevant actor-sets").

The policy engine module 340 compares the updated relevant actor-sets to the cached relevant actor-sets to determine whether they differ. If the updated relevant actor-sets and the cached relevant actor-sets are identical, then the policy engine module 340 sends no actor-sets to the managed server. In this situation, the previously-generated relevant actor-sets are consistent with the change to the administrative domain state 320 and do not need to be re-sent to the managed server. If the updated relevant actor-sets and the cached relevant actor-sets differ, then the policy engine module 340 determines which actor-sets should be added, removed, or modified relative to the cached relevant actor-sets. The policy engine module 340 instructs the managed server to add, remove, or modify the various actor-sets, as appropriate. In one embodiment, for greater efficiency, actor-sets are sent in "diff" format, which describes differences between the cached relevant actor-sets and the updated relevant actor-sets. For example, the diff format specifies an actor-set identifier and an indication of whether that actor-set should be added to, removed from, or modified relative to the previously-sent actor-sets.

Recall that the policy engine module 340 can update a managed server's management instructions (based on a change to the administrative domain-wide management policy 330) and send the updated management instructions to the managed server. A change to the management policy 330 is, for example, the addition, removal, or modification of a rule or a rule set. In one embodiment, a change to the management policy 330 is generated by interaction with the global manager 120 via a GUI or API. In another embodiment, a change to the management policy 330 is generated by an automated process within the global manager 120 (e.g., in response to a security threat detected by the global manager). The policy engine module 340 updates the managed server's management instructions and sends the updated management instructions to the managed server in a similar way, regardless of whether there was a change to the management policy 330 or a change to the administrative domain state 320. However, there are a few differences.

In the case of a change to the management policy 330, the policy engine module 340 does not necessarily update management instructions for all managed servers 130. Instead, the policy engine module 340 compares the previous management policy 330 to the new management policy 330 to determine which rules should be added, removed, or modified relative to the previous management policy 330. The policy engine module 340 determines which managed servers 130 are affected by the changed rules (e.g., which managed servers are covered by a) the rules' and/or scopes' PB and/or UB portions and b) the rules' conditional portions (if any)). The policy engine module 340 executes the relevant rules module 350, providing as input the changed rules (instead of the entire new management policy 330) and the UID of the managed server 130 (for only those servers that are affected by the changed rules).

The administrative domain state update (ADSU) module 385 receives changes to the administrative domain state 320 and processes those changes. A change to the administrative domain state 320 is, for example, the addition, removal, or modification of a description of a managed server 130 (including the modification of a managed server's label set or configured characteristics) or a description of an unmanaged device or unmanaged device group. In one embodiment, a change to the administrative domain state 320 originates in local state information received from a particular managed server 130. In another embodiment, a change to the administrative domain state 320 is generated by interaction with the global manager 120 via a GUI or API. In yet another embodiment, a change to the administrative domain state 320 is generated by an automated process within the global manager 120 (e.g., in response to a security threat detected by the global manager).

Policy Implementation Module

Figure 4:
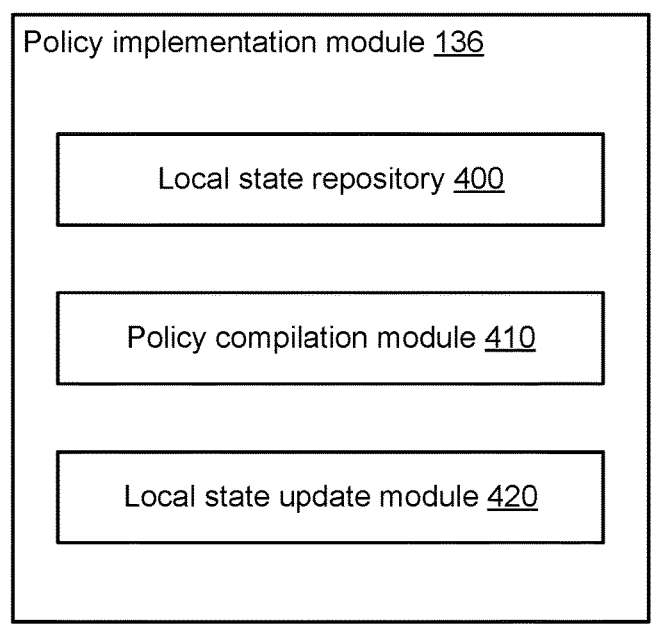
FIG. 4 is a high-level block diagram illustrating a detailed view of a policy implementation module of a managed server, according to one embodiment.

FIG. 4 is a high-level block diagram illustrating a detailed view of a policy implementation module 136 of a managed server 130, according to one embodiment. The policy implementation module 136 includes a local state repository 400, a policy compilation module 410, and a local state update module 420. The local state repository 400 stores information regarding the local state of the managed server 130. In one embodiment, the local state repository 400 stores information regarding the managed server's operating system (OS), network exposure, and services. OS information includes, for example, an indication of which OS is running. Network exposure information and service information were described above with respect to a description of a managed server 130 within the administrative domain state 320.

The policy compilation module 410 takes as input management instructions and state of a managed server 130 and generates a management module configuration 134. For example, the management instructions are received from the global manager 120 and include function-level instructions (generated by the function-level instruction generation module 360) and relevant actor-sets (output by the relevant actors module 380). The state of the managed server 130 is retrieved from the local state repository 400. In one embodiment, execution of the policy compilation module 410 is triggered by a) the managed server powering up or coming online, b) the managed server receiving management instructions, and/or c) the contents of the local state repository 400 changing.

The policy compilation module 410 maps the function-level instructions and relevant actor-sets into a management module configuration 134. For example, the policy compilation module 410 maps an access control function-level instruction (which contains a port and an actor-set reference) into an iptables entry and an ipset entry in the Linux operating system or a Windows Filtering Platform (WFP) rule in the Windows operating system.

The application of management policy at a managed server 130 can be affected by the local state of that server. In one embodiment, the policy compilation module 410 evaluates a condition associated with a received function-level instruction and generates the management module configuration 134 based on the result of that evaluation. For example, the policy compilation module 410 evaluates a condition that references the operating system of the managed server's peer (i.e., the other actor in the relationship) and selects function profile attributes based on the result of that evaluation, where the selected function profile attributes are expressed in the management module configuration 134.

As another example, recall that a managed server 130 can receive a function-level instruction that turns out to be irrelevant for that server. For example, the rule includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The policy compilation module 410 checks the managed server's local state (e.g., determines whether the managed server is providing that service). This determination amounts to evaluating a condition that references the managed server's local state. The policy compilation module 410 processes the function-level instruction accordingly. If the policy compilation module 410 determines that the condition evaluates to "true" (e.g., the managed server is providing that service), then the policy compilation module 410 incorporates that function-level instruction into the management module configuration 134. Specifically, the policy compilation module 410 incorporates function-level instructions into the management module configuration 134 only after evaluating the associated condition (which concerns the local state of that server). If the evaluation of the condition is false, then the policy compilation module 410 does not express the function-level instructions in the management module configuration 134.

The specific conditions (e.g., their nature and particular values) are extensible. In one embodiment, the conditions are related to the definition of a "service" and include process information and/or package information (described above with respect to a description of a managed server 130 within the administrative domain state 320).

For example, consider a function-level instruction that allows access to only the Apache service inbound on port 80 (i.e., where the managed server 130 is the "provider" or endpoint). The managed server 130 expresses this function-level instruction in the management module configuration 134 to allow access on port 80 only after evaluating the associated condition, which concerns whether the application (executing on that server) that is listening on port 80 is actually Apache and not some other application (rogue or otherwise). The managed server 130 expresses this function-level instruction in the management module configuration 134 only after determining that the associated condition evaluates to "true." If the associated condition evaluates to "false," then the managed server 130 does not express this function-level instruction in the management module configuration 134. As a result, the network traffic is blocked.

In one embodiment, a managed server 130 monitors its outbound connections. The managed server 130 compares outbound network traffic to its internal process table to determine which processes in that table are establishing those outbound connections. The managed server 130 can enforce a rule that allows only certain processes (given a set of requirements, mentioned above as "process information") to establish an outbound connection.

In one embodiment (not shown), the policy compilation module 410 is located at the global manager 120 instead of at the managed server 130. In that embodiment, the global manager 120 does not send management instructions to the managed server 130. Instead, the managed server 130 sends its local state to the global manager 120. After the policy compilation module 410 generates the management module configuration 134 (at the global manager 120), the management module configuration 134 is sent from the global manager 120 to the managed server 130.

The local state update (LSU) module 420 monitors the local state of the managed server 130 and sends local state information to the global manager 120. In one embodiment, the LSU module 420 determines an initial local state of the managed server 130, stores appropriate local state information in the local state repository 400, and sends that local state information to the global manager 120. The LSU module 420 determines the local state of the managed server 130 by inspecting various parts of the server's operating system (OS) and/or file system. For example, the LSU module 420 obtains service information from the OS' kernel tables (networking information), the OS' system tables (package information), and the file system (files and hash values). The LSU module 420 obtains network exposure information from the OS' kernel and and/or OS-level data structures.

After the LSU module 420 sends the initial local state information to the global manager 120, the LSU module monitors changes to the local state. The LSU module monitors changes by, for example, polling (e.g., performing inspections periodically) or listening (e.g., subscribing to an event stream). The LSU module 420 compares recently-obtained local state information to information already stored in the local state repository 400. If the information matches, then the LSU module 420 takes no further action (until local state information is obtained again). If they differ, then the LSU module 420 stores the recently-obtained information in the local state repository 400, executes the policy compilation module 410 to re-generate the management module configuration 134 (and re-configures the management module 132 accordingly), and notifies the global manager 120 of the change. In one embodiment, the LSU module 420 sends changes to local state information to the global manager 120 in "diff" format, which describes differences between the local state information that was previously stored in the local state repository 400 (and, therefore, previously sent to the global manager 120) and the recently-obtained local state information. For example, the diff format specifies a type of local state information (e.g., operating system) and a new value for that information type. In another embodiment, the LSU module 420 sends the entire contents of the local state repository 400 to the global manager 120.

Network Flow Analyzer

Figure 5:
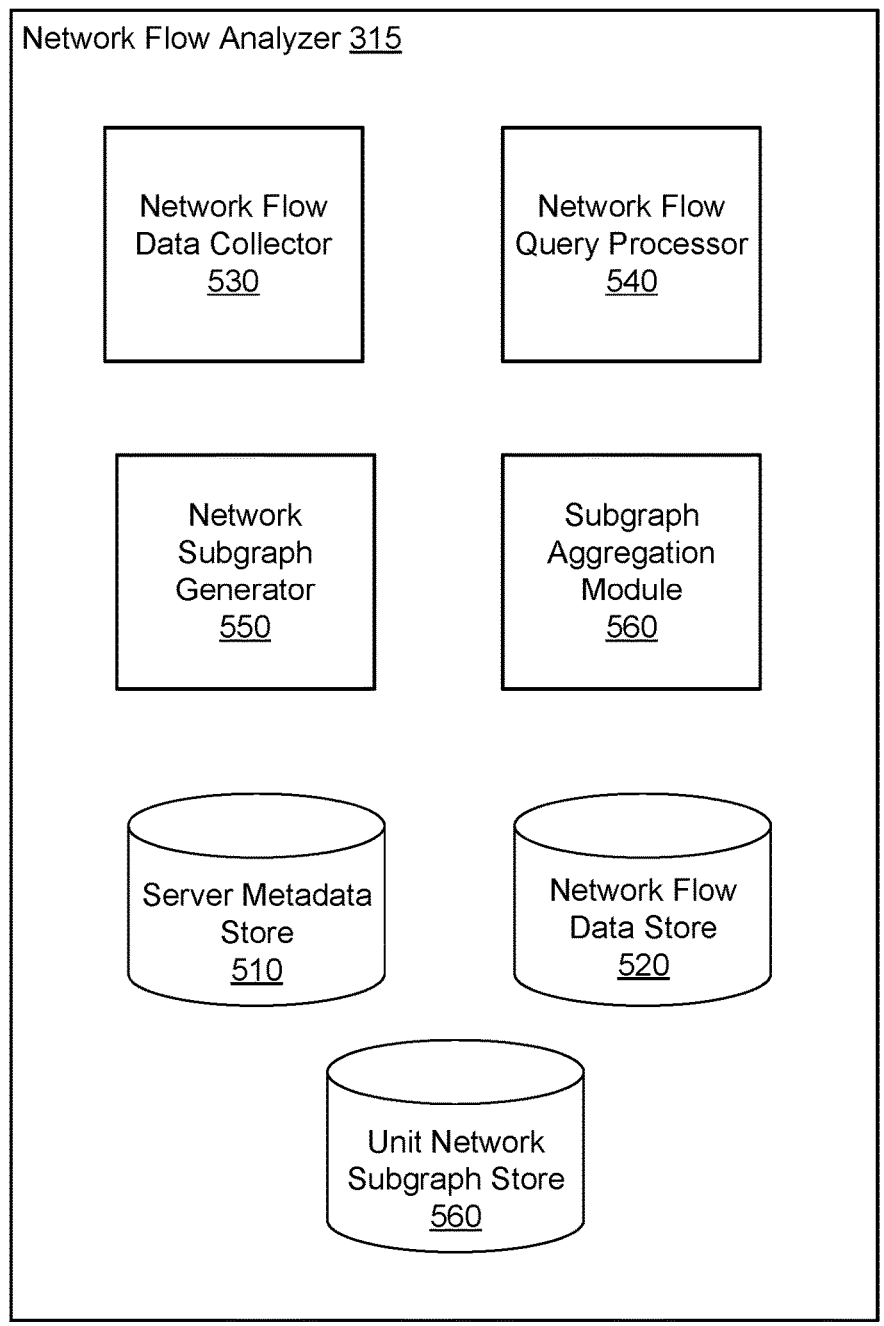
FIG. 5 is a high-level block diagram illustrating a detailed view of a network flow analyzer, according to an embodiment.

FIG. 5 is a high-level block diagram illustrating a detailed view of a network flow analyzer, according to an embodiment. The network flow analyzer 315 comprises a server metadata store 510, a network flow data store 520, a network flow data collector 530, a network flow query processor 540, a unit network subgraph generator 550, and a network graph aggregation module. In other embodiments, the network flow analyzer 315 may include more or fewer modules than those indicated in FIG. 5. Functionality indicated herein as being performed by a module may be performed by other modules than those indicated herein.

The server metadata store 510 stores metadata describing various servers. A server may be a managed server or an unmanaged device (or unmanaged server). The metadata describing a server includes information describing whether or not the server is paired, network interfaces associated with the server, any labels associated with the server, and so on. In an embodiment, the data of the server metadata store 510 is stored in a relational database. The data of the server metadata store 510 may also be stored in a distributed database comprising a plurality of database systems such that each of the plurality of database system processes a portion of the data stored in the server metadata store 510. Accordingly, the metadata of each sever may be mapped to a database system from the plurality. In an embodiment, each of the plurality of database systems is an in-memory database system. Accordingly, the distributed database comprising the plurality of database systems act as a cache for providing fast access to the server metadata. If the network flow analyzer 315 includes a relations database storing the server metadata as well as a distributed database, database triggers of each of the systems are used to keep the data in sync. For example, if the metadata of a server is updated in the relational database, a trigger in the relational database is invoked to update the corresponding data in the distributed database.

The network flow data collector 530 receives information describing communications between servers and stores the information in network flow data store 520. For example, when a source server sends a communication via network to a destination server, the source server sends information describing the communication to the network flow data collector 530 for storing in the network flow data store 520. These communications are also referred to as network flows. The information describing the communication may include a flag indicating whether the communication was accepted by a server or blocked by a server. For example, a policy implemented by a server may block certain communications based on certain criteria. The server may receive the communication and block it such that the communication is not delivered to a software module to which the communication was targeted. The server provides information describing the communication that indicates that the communication was blocked. Similarly, the server may accept the communication and deliver the communication to a software module to which the communication was targeted. In this case, the server provides information describing the communication that indicates that the communication was accepted. In an embodiment, the server provides further information describing accepted communications that indicate whether the communication was allowed or potentially blocked. The information indicating whether the communication was accepted or blocked allows the network flow analyzer 215 to determine a particular policy decision applies to the network traffic.

In an embodiment, each server aggregates information describing communications sent by the server and periodically sends the data describing the communications to the network flow data collector 530 for storing in the network flow data store 520. In an embodiment, the network flow data store 520 is implemented as a distributed database comprising a plurality of database systems such that each of the plurality of database system processes a portion of the network flow data. In an embodiment, each of the plurality of database systems is an in-memory database system. Accordingly, the distributed database comprising the plurality of database systems act as a cache for providing fast access to the network flow data. In an embodiment, the network flow data collector 530 is implemented as a web service.

The network flow data collector 530 parses the network flow data describing communications between servers and adds information describing the communications into a set of hash data structures. The data describing a communication specifies information identifying the source and destination servers of the communication. For example, the data describing a communication may specify a source server network address and a destination server network address. The server network address may be specified as an internet protocol address (IP address).

The network flow data collector 530 resolves the network address of a server to identify an object representing the server, for example, an object stored in a cache implemented as a distributed database. Accordingly, the network flow data collector 530 identifies objects representing the source and destination server from their network addresses. The object representing the servers stores metadata describing the servers. In an embodiment, the network flow data collector 530 maintains an event queue for notifying other services when new information is available.

The network flow data collector 530 identifies each reported communication (or network flow) by a unique string encoding the information describing the communication. The information describing the communication used by the network flow data collector 530 include information identifying the server, source network address, destination network address, destination port number, network protocol used for the communication, and so on. The network flow data collector 530 uses the unique string generated based on the communication as a key for storing information in a data structure, for example, a hash table. The key is used for generating summary data based on all communications that match the hash value of the key.

In an embodiment, the flow summary associated with each key of the hash structure stores information describing attributes describing the last communication that was reported and cumulative counters representing aggregated information over past communications. The attributes describing the last communication include a source server identifier (if known), a destination server identifier (if known), a firewall rule identifier, a policy decision as an enumerated value, a service name (if reported), a process name (if reported), a user name (if reported), and so on. The cumulative counters include total number of communications since a given point in time, a count of all accepted communications, a count of all blocked communications, or counts based on other communications that satisfy specific criteria.

The network flow query processor 540 provides an interface for querying network flow data. In an embodiment, the interface provided by the network flow query processor 540 is an application programming interface. The network flow query processor 540 receives a query specifying criteria for determining a network graph or a network subgraph and returns a representation of the requested network graph or network subgraph. The network graph is also referred to as a network traffic graph. In an embodiment, the network graph is represented as a directed graph with edges representing network flow from source server to a destination server, and nodes representing a server. A node may represent a server using a network addresses or as an object representing the server. In an embodiment, the network graph represents both nodes and edges as composite objects. For example, a composite node may represent servers grouped by a specific label such as location or role. Similarly, a composite edge may represent the network flow as the largest total connection count between two nodes. A network subgraph refers to a subgraph that satisfies a particular filter criterion. The filter criteria may be received via a user interface or specified in a policy. For example, a filter criterion may specify all managed servers having a particular label assignment, for example, managed servers having a particular role specified by a label assignment, managed servers having a particular environment specified by a label assignment, managed servers having a particular application specified by a label assignment, or a combination of various label assignments. The network flow query processor 540 invokes subgraph aggregation modules for generating the network subgraphs of network graphs satisfying a particular filter criterion.

Figure 6:
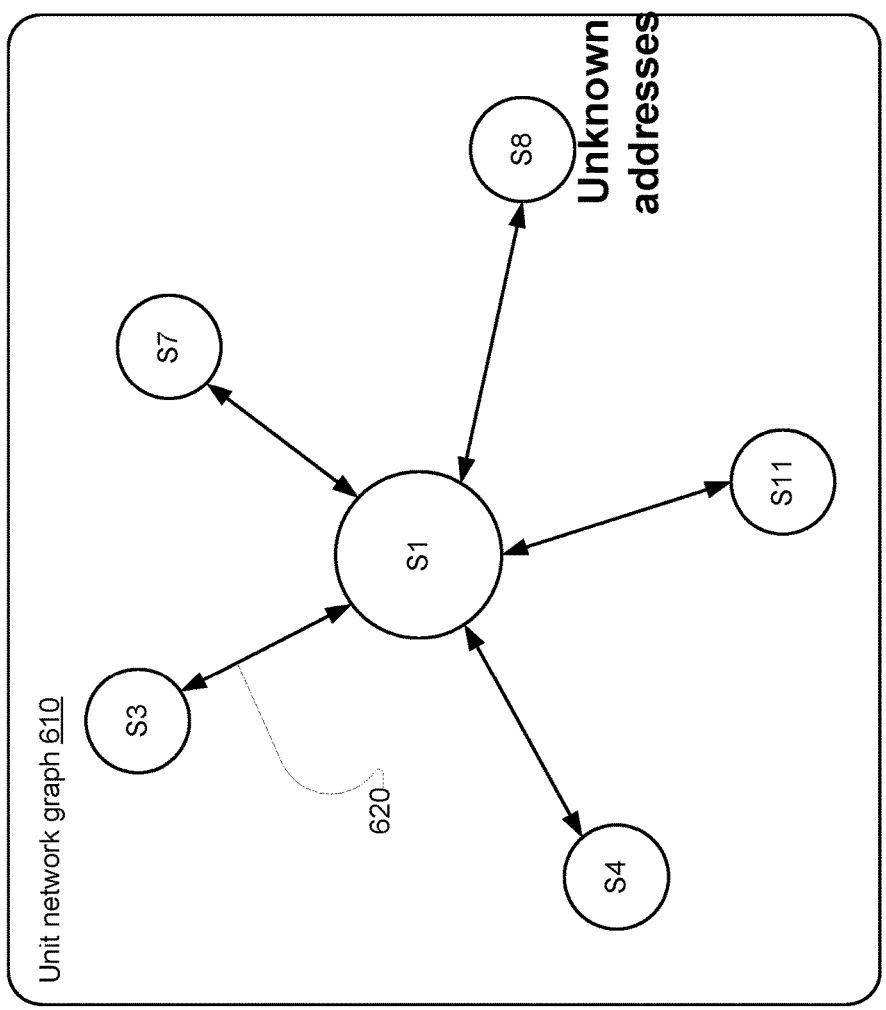
FIG. 6 is an example illustrating a molecule subgraph data structure, according to one embodiment.

The network subgraph generator 550 generates representations of subgraphs based on network flow information. The network subgraph generator 550 generates a unit network subgraph representation for each server. FIG. 6 illustrates a unit network subgraph for a server S1. The unit network subgraph represents communication information associated with a particular server. The unit network subgraph includes a representation of that particular server and representations of other servers that interact with that particular server via network communications. Accordingly, FIG. 6 shows a unit network graph representation 610 of server S1. The unit network graph representation 610 includes a representation of server S1 and representations of servers S3, S7, S4, S8, and S11 that communicate with the server S1. The unit network graph representation 610 also includes edges 620 connecting representation of server S1 with representations of other servers that S1 communicates with, for example, S3, S7, S4, S8, and S11.

A node in a unit network subgraph comprises information identifying a server, for example, a server address, an object representation of the server, or a network address of a server. An edge 620 represents communications sent by the server S1 and communications received by the server S1. An edge 620 may be a detailed edge or a summary edge. A detailed edge represents detailed information describing communications between a source server and the destination server. For example, a detailed edge may describe all the reported flows. In an embodiment, the detailed edge describes reported flows sorted by one or more attributes describing communications, for example, port on which the communications occur, a protocol associated with the communication, or timestamp associated with the communication. A summary edge represents aggregate information based on communications between a source server and the destination server, for example, a count of all communications between the source server and the destination server, the port and protocol with the greatest number of total flows, or a count of total number of communications filtered by certain criteria.

Accordingly, the network subgraph generator 550 may generate summary graph comprising summary edges. Alternatively, the network subgraph generator 550 may generate a detailed graph comprising detailed edges. In an embodiment, the network subgraph generator 550 represents a unit network subgraph as a serialized data structure. The network subgraph generator 550 updates the representation of the unit network subgraph for a server whenever new network flow data is received from the server. In an embodiment, the network subgraph generator 550 builds a unit network subgraph on-the-fly, for example, if the unit network subgraph for the server is not found in the cache.

Figure 7:
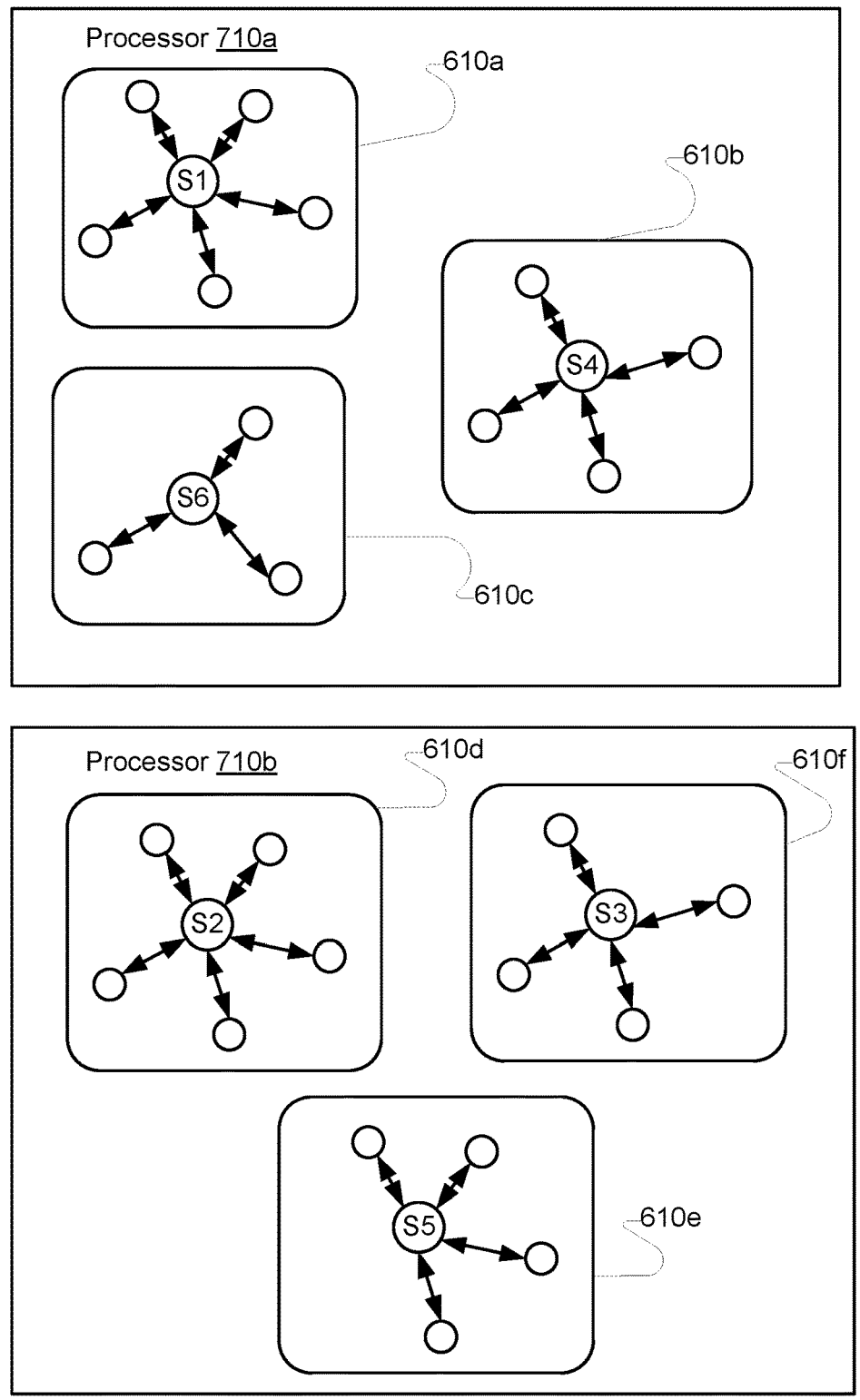
FIG. 7 is an example illustrating distributed processing based on a molecule subgraph data structure, according to one embodiment.

The network subgraph generator 550 stores the unit network subgraphs in a unit network subgraph store 560. The unit network subgraph store 560 may be a distributed system, for example, a distributed in-memory cache. FIG. 7 is an example illustrating distributed processing based on a molecule subgraph data structure, according to one embodiment. Since each unit network subgraph can be created and updated independent of other unit network subgraphs, a set of unit network subgraphs can be divided into subsets and each subset processed independent of the other subsets.

As shown in FIG. 7, the unit network subgraphs 610a, 610b, and 610c are processed by processor 710a, whereas unit network subgraphs 610d, 610e, and 610f are processed by processor 710b. The unit network subgraphs representation allows the network flow information to be represented in a distributed fashion across a plurality of processors such that the information is aggregated in parallel to generate partial results that are combined to generate the requested result for a query.

Creating and Updating Unit Network Subgraphs

Figure 8:
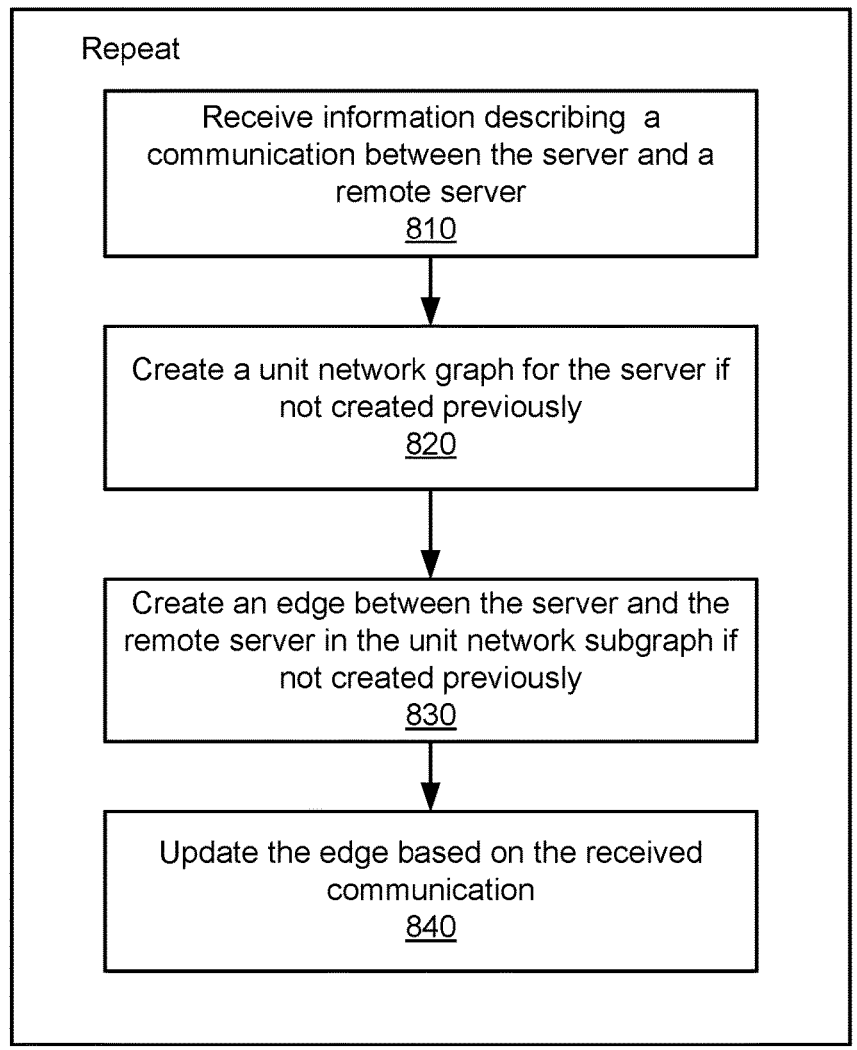
FIG. 8 shows a flowchart illustrating the process of generating unit network subgraphs, according to an embodiment.

FIG. 8 shows a flowchart illustrating the process of generating unit network subgraphs, according to an embodiment. The network subgraph generator 550 receives 810 information describing a communication associated with a source server. The communication may be sent by the source server to a remote server or may be received by the source server from a remote server. The network subgraph generator 550 may receive the information describing the communication from the network flow data collector 530. Alternatively, the network subgraph generator 550 may retrieve the information from the network flow data store 520.

The network subgraph generator 550 creates 820 a unit network subgraphs for the source server specified in the communication if the corresponding unit network subgraphs was not previously created. If a unit network subgraphs was previously created and stored in the unit network subgraph store 560, the network subgraph generator 550 updates the information of the stored unit network subgraph to incorporate the information describing the new communication. In an embodiment, the information of a unit network subgraph is recalculated and updated whenever new network flow data is received by the network flow data collector 530. A unit network subgraph is stored in a cache for fast access. In an embodiment, if network flow data associated with a unit network subgraph is received and the unit network subgraph data is cached, the network subgraph generator replaces the representation in the cache with an updated representation rather than modifying the existing representation.

If the communication was sent by the source server to the remote server, and there is no edge between the source server and the remote server in the unit network subgraph of the server, the network subgraph generator 550 creates a representation of the remote server in the unit network subgraph of the source server and creates 830 an edge from the source server to the remote server. If the unit network subgraph of the source server includes an edge between the source server and the remote server, the network subgraph generator 550 updates 840 the edge between the source server and the remote server in the unit network subgraph based on the received communication. For example, if the edge between the source server and the remote server is a detailed edge, the information describing the new communication is added to the description of the detailed edge. If the edge between the source server and the remote server is a summary edge representing certain type of aggregate information, the aggregate information is updated based on the received communication.

As an example, assume that a communication is received for which the source server is S1 and the remote server is S2. In this example, the unit network subgraph store 560 stores a unit network subgraph for server S1. The network subgraph generator 550 updates the unit network subgraph representation of the server S1 based on the received communication. If the unit network subgraph of server S1 does not include a representation of server S2, the unit network subgraph store 560 adds a representation of server S2 and an edge 620 connecting S1 to S2. If the unit network subgraph of server S1 includes server S2, the unit network subgraph of server S1 updates the edge representation based on the new communication.

Policies Based on Network Graph

In an embodiment, the global manager 120 implements an administrative domain-wide management policy 330 that specifies an expression based on a network subgraph. An administrative domain-wide management policy 330 may specify an expression that describes communications sent or received by a set of servers. The set of servers may be identified based on labels, for example, a set of servers associated a particular role, application, environment, and so on. For example, an administrative domain-wide management policy 330 may monitor all communications sent or received by a set of servers and take a particular action if the communications satisfy certain criteria. In an embodiment, the expression specified by the administrative domain-wide management policy 330 acts as a condition to be evaluated that determines whether a particular action specified by the administrative domain-wide management policy 330 is performed.

Figure 9:
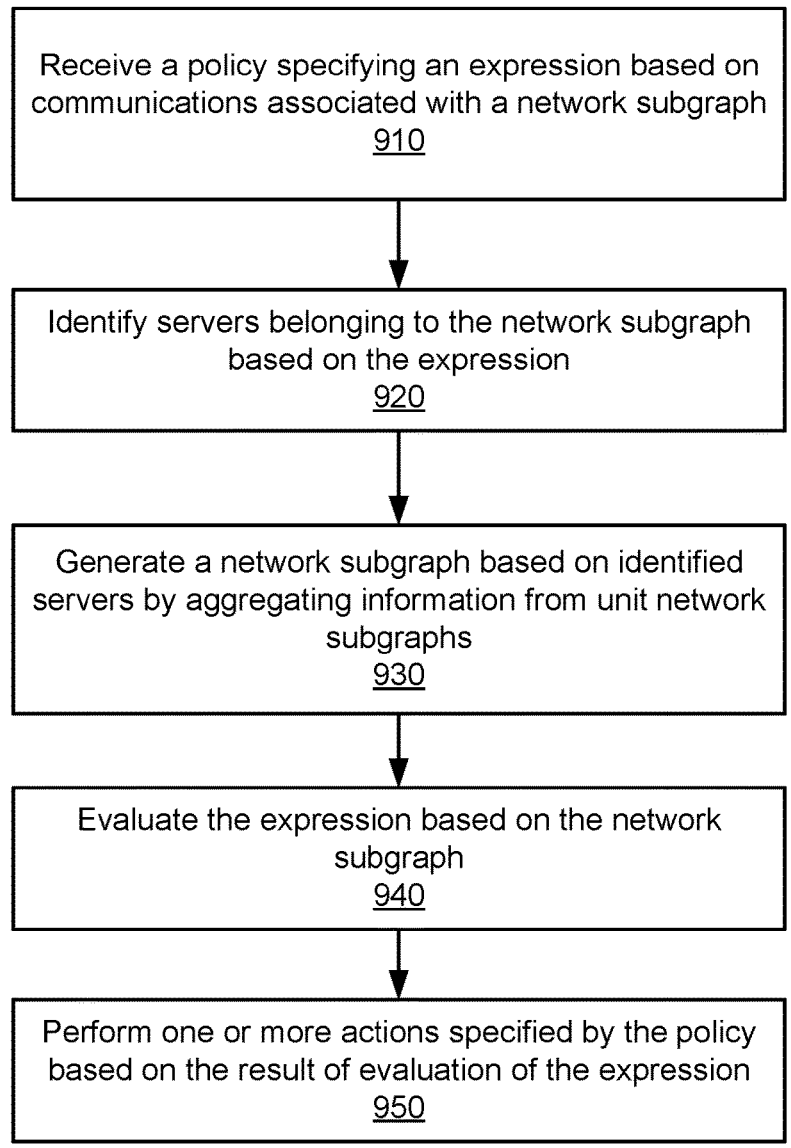
FIG. 9 shows a flowchart illustrating the process of implementing a policy based on a network subgraph, according to an embodiment.

FIG. 9 shows a flowchart illustrating the process of implementing a policy based on a network subgraph, according to an embodiment. The global manager 120 receives 910 a policy (for example, an administrative domain-wide management policy) specifying an expression based on communications associated with a network subgraph. The policy specifies one or more actions to be performed based on the result of evaluating the expression.

The expression identifies the servers for the network subgraph based on labels. The network flow analyzer 315 evaluates the expression to determine whether an action specified by the policy needs to be performed. In an embodiment, the network flow analyzer 315 evaluates the expression repeatedly, for example, on a periodic basis.

As an example, an expression specified by a policy may determine anomalous traffic patterns. For example, the expression may compare an aggregate value based on communications either originating from or received by a set of servers satisfying a particular label assignment. If the aggregate value exceeds the threshold value, the policy engine module 340 takes certain action specified by the policy, for example, by sending an alert to a system administrator or by shutting down certain services that are determined to cause the network to overload.

As another example, an expression specified by a policy determines whether certain communications indicate malicious activities. For example, the expression may evaluate to true if communications received or sent by a server violate a rule associated with the policy. If the policy engine module 340 determines based on the result of the evaluation of the expression that a server is exhibiting malicious behavior, the policy engine module 340 takes appropriate actions. Examples of actions based on the policy include quarantining the server or isolating the server by restricting the communications sent or received by the server.

In an embodiment, the global manager 120 monitors the network flow to determine if certain condition is satisfied and makes recommendations of specific policies based on the conditions. If the global manager 120 determines that certain condition indicating a network flow pattern is satisfied, the global manager 120 recommends certain policies, for example, to a system administrator. For example, the recommended policy may limit certain types of communications or communications from certain servers having a specific label assignment.

The network flow analyzer 315 identifies 920 the servers specified by the expression. For example, the expression may specify a network subgraph of all servers associated with a particular label value, for example, all servers associated with a particular role, an application, or environment. The network flow analyzer 315 identifies 920 the set of servers that have the particular label value.

The network subgraph generator 550 generates 930 a network subgraph comprising all communications associated with the identified set of servers. The network flow analyzer 315 aggregates information stored in unit network subgraphs corresponding to each server to generate the network subgraph. The network flow analyzer 315 stores a representation of the network subgraph.

The network flow analyzer 315 evaluates 940 the expression specified by the policy based on the subgraph. For example, if the expression specifies an aggregate value based on communications associated with the network subgraph having a particular characteristic, the network flow analyzer 315 determines the aggregate value based on the representation of the network subgraph. The global manager 120 determines whether a particular action specified in the policy is performed based on the result of evaluation of the expression.

The network subgraph generator 550 generates a network subgraph representing network flow data for a group of servers by combining unit network subgraphs for a set of servers. The generated network graph has nodes representing servers, or groups of servers, and other objects of interest such as network address lists used in policy. The network subgraph generator 550 may generate a network graph for processing a query received by network flow query processor 540.

Figure 10:
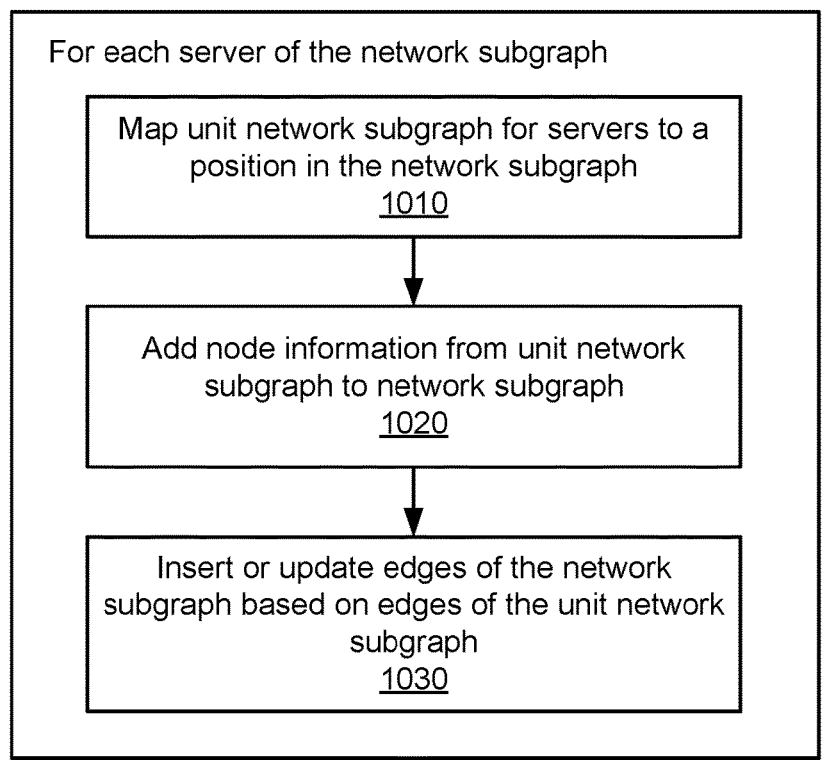
FIG. 10 shows a flowchart illustrating the process of generating a network subgraph by aggregating unit network subgraphs, according to an embodiment.

FIG. 10 shows a flowchart illustrating the process of aggregating unit network subgraphs for generating network subgraphs, according to an embodiment. The network subgraph generator 550 builds a data structure representing the network subgraph. In an embodiment, the network subgraph generator 550 creates a set of nodes representing each server identified for including in the network subgraph. The set of nodes may be represented as a data structure, for example, a list, an array structure, or any data structure configured to store a set of objects. The network subgraph generator 550 maps 1010 unit network subgraphs corresponding to servers identified 920 for the network subgraphs to a position in the data structure created for the network subgraphs. In an embodiment, the network subgraph generator 550 creates an index that maps nodes of the network subgraph with unit network subgraphs for the corresponding servers. The network subgraph generator 550 adds node information for each server of the network subgraph from the unit network subgraph structure to the data structure representing the network subgraph. This includes various attributes describing the server that may be stored in the unit network subgraph. The network subgraph generator 550 inserts 1030 or updates edges of the network subgraph based on edges of the unit network subgraph. In an embodiment, the network subgraph generator 550 iterates through each edge of the unit network subgraph and determines whether the information describing the edge needs to be included in the network subgraph being generated. If the network subgraph generator 550 determines that the information describing the edge needs to be included in the network subgraph being generated, the network subgraph generator 550 determines whether a new edge needs to be created in the network subgraph or the information describing the edge should be incorporated in an existing edge of the network subgraph. For example, if the current edge represents communication from server S1 to a remote server S2 and is the first edge between S1 and S2 that is being processed, the network subgraph generator 550 creates a new edge between nodes of the network subgraph representing S1 and S2 and incorporates the information of the edge of the unit network subgraph in the new edge created. However, if the network subgraph generator 550 determines that there is an edge existing between the servers S1 and S2 in the network subgraph, the network subgraph generator 550 incorporates the information of the edge of the unit network subgraph in the existing edge.

Processing Network Flow Queries

The network flow analyzer 315 is configured to process queries based on network flow. For example, the global manager 120 may present a user interface that allows a user to view a visual representation of the network. The user interface is configured to review user interactions that require determination of network subgraphs. For example, a user may request all communications initiated by servers having a particular role or environment as specified by the labels. Similarly, a user may request all communications having a particular attribute, for example, communications associated with a fire wall, or communications locked by a firewall, and so on.

Figure 11:
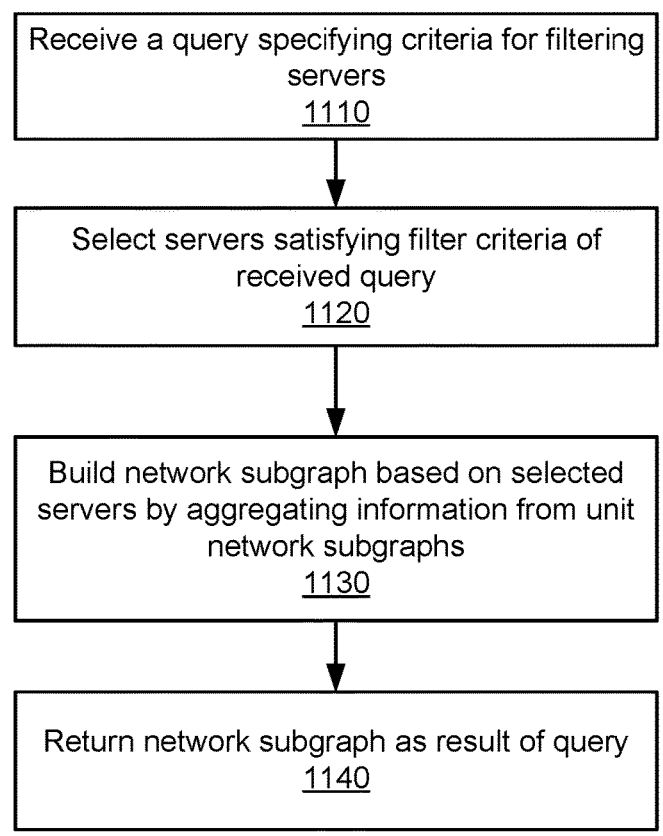
FIG. 11 shows a flowchart illustrating the process of aggregating unit network subgraphs for processing queries, according to an embodiment.

FIG. 11 shows a flowchart illustrating the process of processing queries requesting network subgraphs, according to an embodiment. The network flow query processor 540 receives 810 a query specifying criteria for filtering servers or criteria for filtering communications. For example, the query may filter all servers having a particular label assignment, for example, a particular role, a particular environment, a particular location, or a combination of various label assignments. A query may filter all communications satisfying particular criteria, for example, all communications that were processed by a particular firewall rule, all communications associated with a service, all communications associated with a user, all communications associated with a process, and so on. The filtering criteria may combine criteria for filtering servers with criteria for filtering communications, for example, a criteria specifying all communication associated with a particular service that were sent by servers having a particular label assignments.

The network flow query processor 540 selects 820 the set of servers that satisfy the filtering criteria specified in the received query. In an embodiment, the query processor 540 selects 820 the set of servers by identifying the objects representing the servers stored in the server metadata store 510. The network subgraph generator 550 generates 1130 a network subgraph based on selected servers by aggregating information from unit network subgraphs. The process for generating the network subgraphs is described in FIG. 10. If the filtering criteria comprise criteria for filtering communications, the network subgraph generator 550 selects communications from unit network subgraphs that satisfy the filtering criteria for generating the network subgraph. The network subgraph generator 550 returns 1140 the generated subgraph for the module or client device requesting the information.

In an embodiment, the process described in FIG. 11 is used for processing queries obtained from client devices for displaying a user interface describing a network. The queries may be generated in response to user interactions with the user interface. For example, the user interface is configured to receive requests for network subgraphs from users. A user provides a request to view a network subgraph based on a given filtering criteria. The user interface sends a request to the global manager 120 that is processed by the network flow query processor 540. The network flow query processor 540 generates the requested network flow graph and provides the generated network flow graph to the user interface for rendering an image based on the network flow graph.

In an embodiment, the network flow query processor 540 receives queries from a policy engine module 340. A policy engine module 340 may implement a policy that specifies an expression. The policy engine module 340 generates a query based on the expression. The policy engine module 340 sends the generated query to the network flow query processor 540. The network flow query processor 540 processes the query and provides the result of processing the query to the policy engine module 340. The policy engine module takes one or more actions based on the result provided by the network flow query processor 540. The policy may be a security policy or a resource management policy.

ALTERNATIVE APPLICATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

I claim:

1. A method for remediating an undesired traffic pattern detected based on network subgraphs, the method comprising:
 receiving information describing communications between a plurality of servers interacting via a network, each communication associated with an identifier of a source server, an identifier of a destination server, and one or more attributes describing the communication;
 for each server of the plurality of servers, generating a unit network subgraph representing communications associated with the server, the unit network subgraph comprising a node representing the server and one or more edges describing communications of the server with other servers;

receiving a rule identifying a subset of the plurality of servers, a condition representative of an undesired traffic pattern in the communications between the subset of the plurality of servers to be evaluated by the rule, and an action to be taken in response to the condition being satisfied to remediate the undesired traffic pattern;

for each of the subset of the plurality of servers, accessing respective unit network subgraphs;

combining the respective unit network subgraphs for the subset of the plurality of servers identified by the rule to generate a network subgraph representing the subset of the plurality of servers as nodes and representing communications between the subset of the plurality of servers as edges between the nodes;

evaluating the condition specified in the rule based on the network subgraph to determine if the condition indicative of the undesired traffic pattern is satisfied; and responsive to the condition being satisfied, performing the one or more actions specified by the rule to remediate the undesired traffic pattern.

2. The method of claim 1, wherein an edge of the network subgraph associated with a first server and a second server is a detailed edge, the detailed edge comprising representations of a plurality of communications between the first server and a second server.

3. The method of claim 1, wherein an edge of the network subgraph associated with a first server and a second server is a summary edge, the summary edge associated with an aggregate value based on a plurality of communications between the first server and a second server.

4. The method of claim 1, wherein generating the unit network subgraph comprises:
receiving, from a first source server, a first communication represented as an identifier of the first source server and an identifier of a first destination server;
determining whether the unit network subgraph includes a representation of the first destination server; and
responsive to determining that the unit network subgraph does not include a representation of the first destination server, adding the representation of the first destination server to the unit network subgraph.

5. The method of claim 4, wherein generating the unit network subgraph comprises:
determining whether the unit network subgraph includes a representation of an edge from the first source server to the first destination server;
responsive to determining that the unit network subgraph does not include a representation of an edge from the first source server to the first destination server, adding a representation of the edge from the first source server to the first destination server, the representation of the edge comprising information describing the first communication; and
responsive to determining that the unit network subgraph includes a representation of an edge from the first source server to the first destination server, updating the representation of the edge based on the first communication.

6. The method of claim 1, wherein generating the unit network subgraphs is performed in parallel by a plurality of processors, wherein a first set of unit network subgraphs is generated by a first processor and a second set of unit network subgraphs is generated by a second processor.

7. The method of claim 1, wherein generating the unit network subgraph comprises:
storing label sets for each of the plurality of servers; and
identifying the subset of the plurality of servers based on the label sets.

8. A computer readable non-transitory storage medium storing instructions for performing steps comprising:
receiving information describing communications between a plurality of servers interacting via a network, each communication associated with an identifier of a source server, an identifier of a destination server, and one or more attributes describing the communication;
for each server of the plurality of servers, generating a unit network subgraph representing communications associated with the server, the unit network subgraph comprising a node representing the server and one or more edges describing communications of the server with other servers;
receiving a rule identifying a subset of the plurality of servers, a condition representative of an undesired traffic pattern in the communications between the subset of the plurality of servers to be evaluated by the rule, and an action to be taken in response to the condition being satisfied to remediate the undesired traffic pattern;
for each of the subset of the plurality of servers, accessing respective unit network subgraphs;
combining the respective unit network subgraphs for the subset of the plurality of servers identified by the rule to generate a network subgraph representing the subset of the plurality of servers as nodes and representing communications between the subset of the plurality of servers as edges between the nodes;
evaluating the condition specified in the rule based on the network subgraph to determine if the condition indicative of the undesired traffic pattern is satisfied; and
responsive to the condition being satisfied, performing the one or more actions specified by the rule to remediate the undesired traffic pattern.

9. The computer readable non-transitory storage medium of claim 8, wherein an edge of the network subgraph associated with a first server and a second server is a detailed edge, the detailed edge comprising representations of a plurality of communications between the first server and a second server.

10. The computer readable non-transitory storage medium of claim 8, wherein an edge of the network subgraph associated with a first server and a second server is a summary edge, the summary edge associated with an aggregate value based on a plurality of communications between the first server and a second server.

11. The computer readable non-transitory storage medium of claim 8, wherein generating the unit network subgraph comprises:
receiving, from a first source server, a first communication represented as an identifier of a first source server and an identifier of a first destination server;
determining whether the unit network subgraph includes a representation of the first destination server; and
responsive to determining that the unit network subgraph does not include a representation of the first destination server, adding a representation of the first destination server to the unit network subgraph.

12. The computer readable non-transitory storage medium of claim 11, wherein generating the unit network subgraph comprises:

determining whether the unit network subgraph includes a representation of an edge from the first source server to the first destination server;

responsive to determining that the unit network subgraph does not include a representation of an edge from the first source server to the first destination server, adding a representation of the edge from the first source server to the first destination server, the representation of the edge comprising information describing the first communication; and responsive to determining that the unit network subgraph includes a representation of an edge from the first source server to the first destination server, updating the representation of the edge based on the first communication.

13. The computer readable non-transitory storage medium of claim 8, wherein generating the unit network subgraphs is performed in parallel by a plurality of processors, wherein a first set of unit network subgraphs is generated by a first processor and a second set of unit network subgraphs is generated by a second processor.

14. The computer readable non-transitory storage medium of claim 8, wherein generating the unit network subgraph comprises:

storing label sets for each of the plurality of servers; and identifying the subset of the plurality of servers based on the label sets.

15. A computer system comprising:

one or more processors;

a computer readable non-transitory storage medium storing instructions for execution by the one or more processors, wherein the instructions perform the steps of:

receiving information describing communications between a plurality of servers interacting via a network, each communication associated with an identifier of a source server, an identifier of a destination server, and one or more attributes describing the communication;

for each server of the plurality of servers, generating a unit network subgraph representing communications associated with the server, the unit network subgraph comprising a node representing the server and one or more edges describing communications of the server with other servers;

receiving a rule identifying a subset of the plurality of servers, a condition representative of an undesired traffic pattern in the communications between the subset of the plurality of servers to be evaluated by the rule, and an action to be taken in response to the condition being satisfied to remediate the undesired traffic pattern;

for each of the subset of the plurality of servers, accessing respective unit network subgraphs;

combining the respective unit network subgraphs for the subset of the plurality of servers identified by the rule to generate a network subgraph representing the subset of the plurality of servers as nodes and representing communications between the subset of the plurality of servers as edges between the nodes;

evaluating the condition specified in the rule based on the network subgraph to determine if the condition indicative of the undesired traffic pattern is satisfied; and responsive to the condition being satisfied, performing the one or more actions specified by the rule to remediate the undesired traffic pattern.

16. A method of processing network flow queries, the method comprising:

receiving information describing communications between a plurality of servers interacting via a network, each communication associated with an identifier of a source server, an identifier of a destination server, and one or more attributes describing the communication;

for each server of the plurality of servers, generating a unit network subgraph representing communications associated with the server, the unit network subgraph comprising a node representing the server and one or more edges describing communications of the server with other servers;

receiving a query identifying a subset of the plurality of servers;

for each of the subset of the plurality of servers, accessing respective unit network subgraphs;

combining the respective unit network subgraphs for the subset of the plurality of servers identified by the rule to generate a network subgraph representing the subset of the plurality of servers as nodes and representing communications between the subset of the plurality of servers as edges between the nodes; and sending information describing the network subgraph for presentation via a client device.

* * * * *